INVENTORS
JOHN F. ROMANS AND
BY ANTON E. PIRMAN

Oberlin + Limbach
ATTORNEYS.

Oct. 5, 1954  J. F. ROMANS ET AL  2,690,702
COMBINED TESTING DEVICE AND MACHINE TOOL
Filed Feb. 5, 1951  16 Sheets-Sheet 6

INVENTORS
JOHN F. ROMANS AND
BY ANTON E. PIRMAN

Oberlin & Limbach
ATTORNEYS

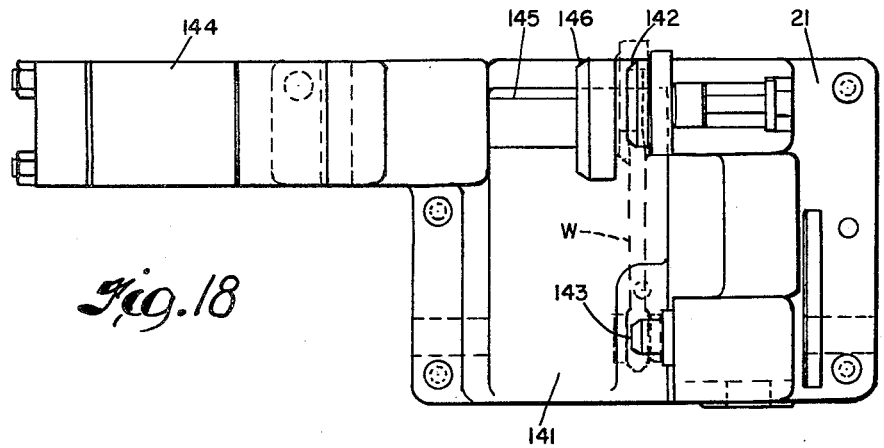
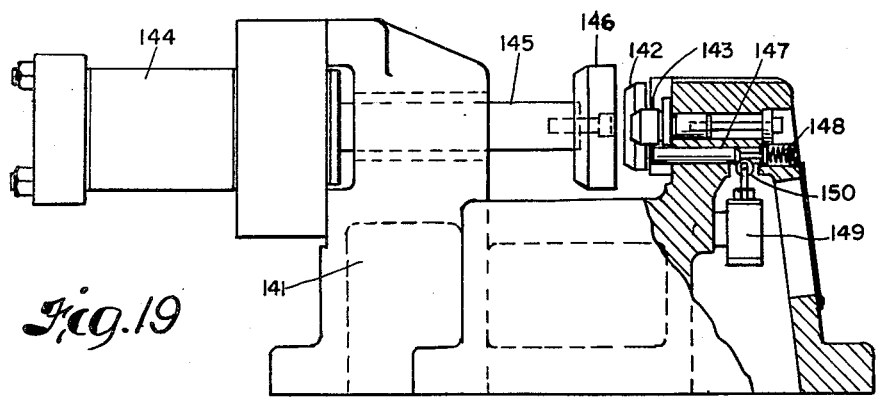
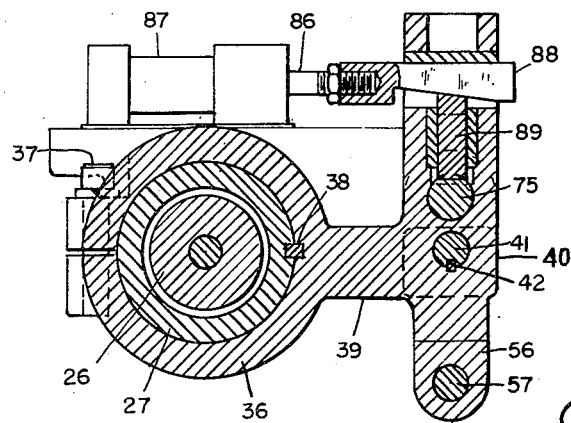

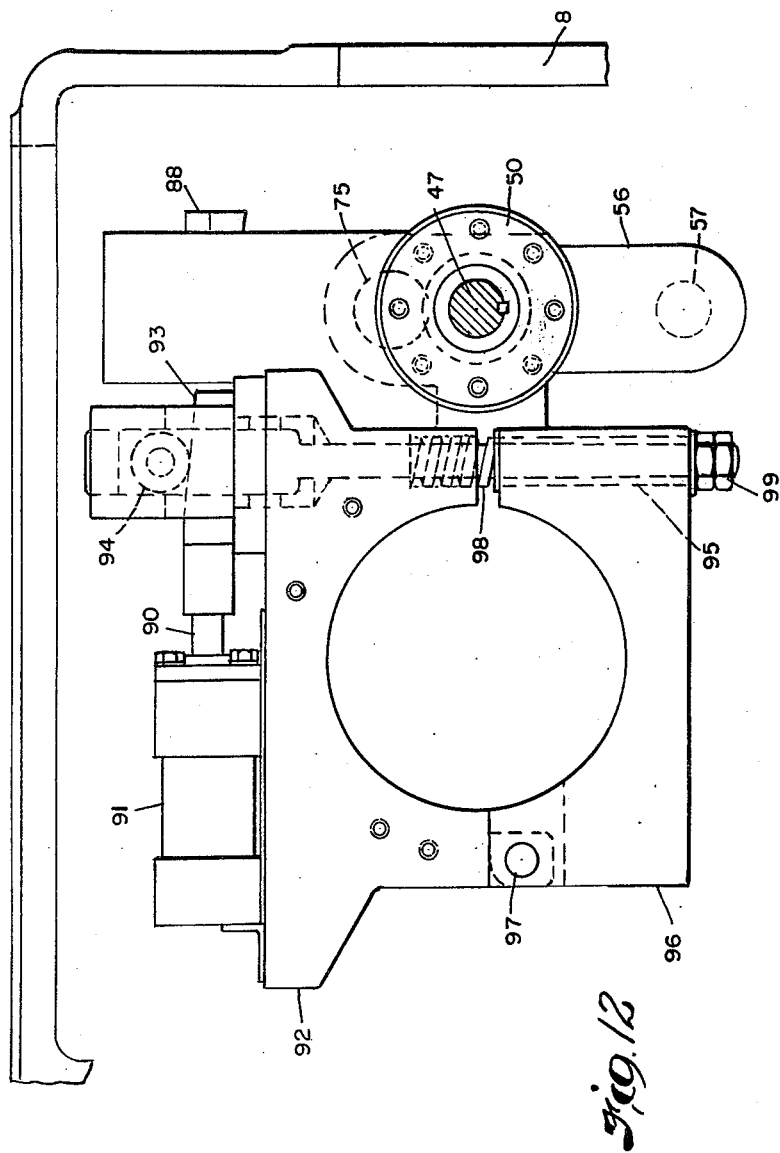

Oct. 5, 1954  J. F. ROMANS ET AL  2,690,702
COMBINED TESTING DEVICE AND MACHINE TOOL
Filed Feb. 5, 1951  16 Sheets-Sheet 9

INVENTORS
JOHN F. ROMANS and
BY ANTON E. PIRMAN

Oberlin + Limbach
ATTORNEYS.

Oct. 5, 1954  J. F. ROMANS ET AL  2,690,702
COMBINED TESTING DEVICE AND MACHINE TOOL
Filed Feb. 5, 1951  16 Sheets-Sheet 10
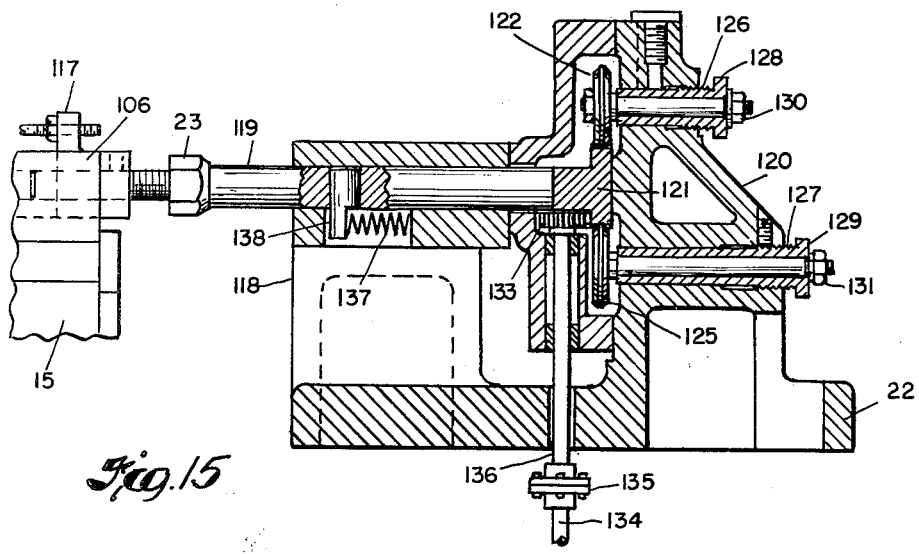
Fig.15
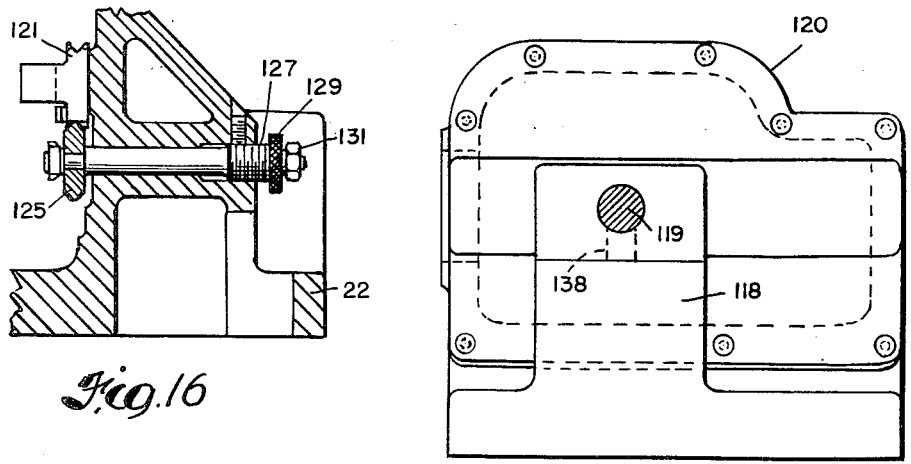
Fig.16
Fig.17
INVENTORS
JOHN F. ROMANS AND
BY ANTON E. PIRMAN
Oberlin + Limbach
ATTORNEYS.

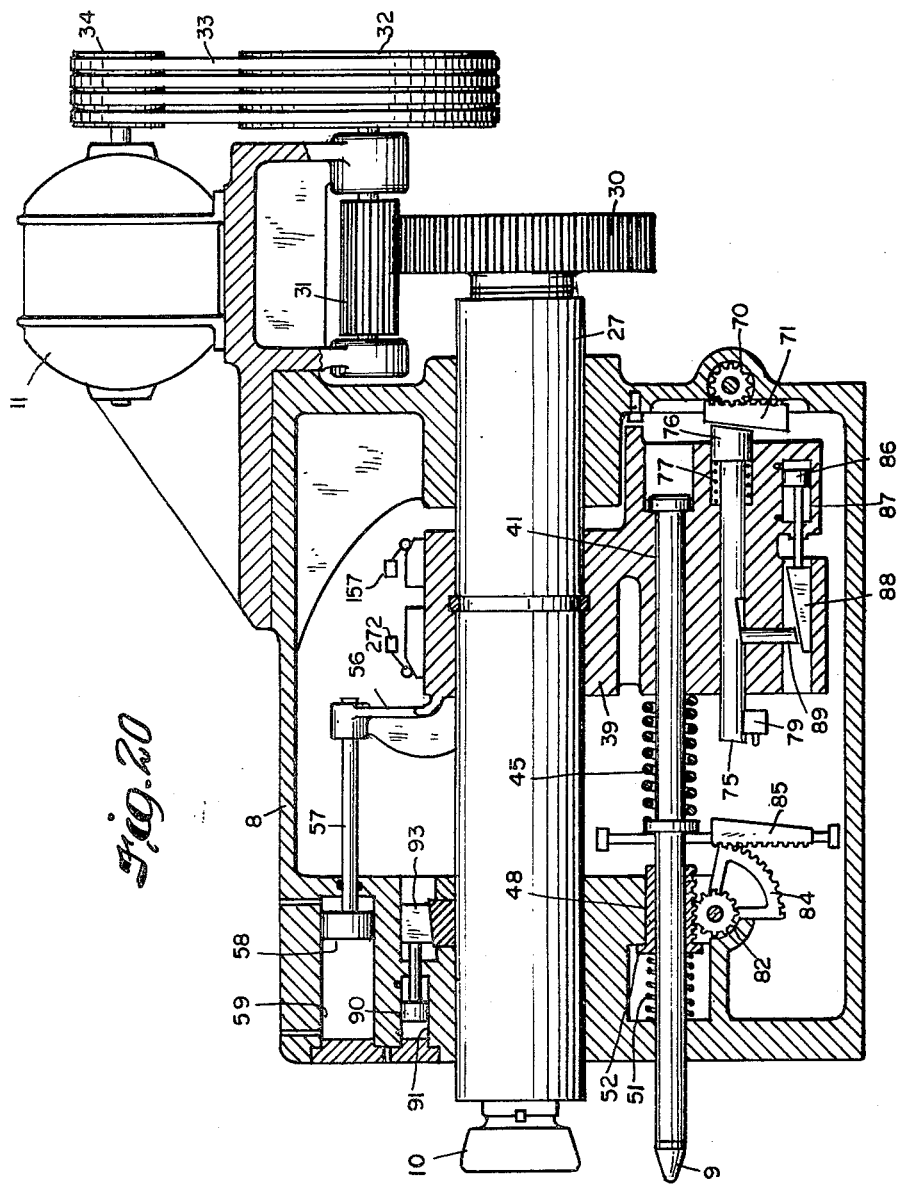

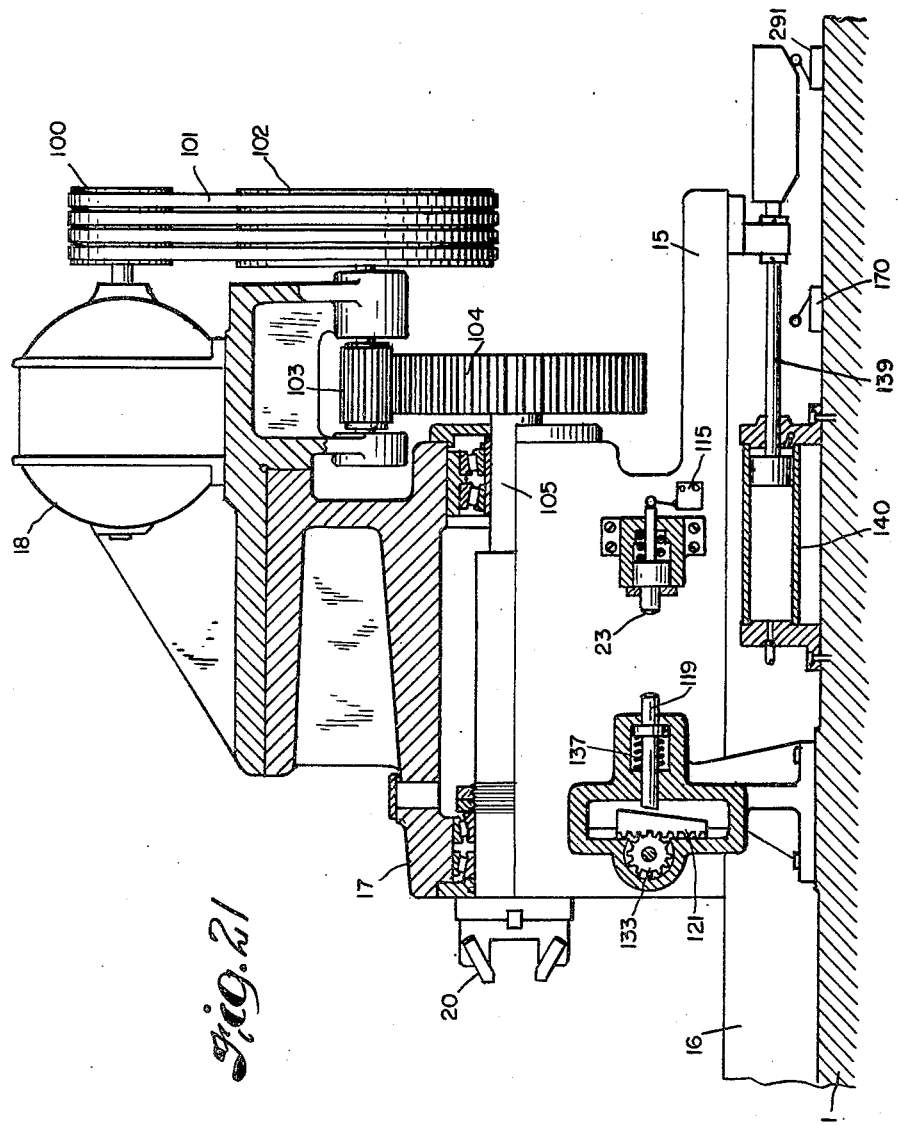

Oct. 5, 1954  J. F. ROMANS ET AL  2,690,702
COMBINED TESTING DEVICE AND MACHINE TOOL
Filed Feb. 5, 1951  16 Sheets—Sheet 16

INVENTORS
JOHN F. ROMANS and
BY ANTON E. PIRMAN

Oberlin & Limbach
ATTORNEYS.

Patented Oct. 5, 1954

2,690,702

UNITED STATES PATENT OFFICE 2,690,702

COMBINED TESTING DEVICE AND
MACHINE TOOL

John F. Romans, Cleveland Heights, and Anton E. Pirman, Cleveland, Ohio, assignors to The Motch & Merryweather Machinery Company, Cleveland, Ohio, a corporation of Ohio Application February 5, 1951, Serial No. 209,344

21 Claims. (Cl. 90—11)

This invention relates as indicated to a combined testing device and machine tool, and more particularly to a weighing and milling machine comprising mechanism adapted to determine the center of gravity or balance or relationship of the weights of opposite ends of elongated objects such as connecting rods and automatically to preset appropriate machine tools such as milling machines to perform the necessary metal removing operations on the work-piece to bring the latter into desired balance and weight.

It has long been appreciated that certain rotating and reciprocating parts of internal combustion engines, for example, require to be brought to an exactly determined weight and balance in order that the engine may operate properly and without undue vibration. For this purpose, very accurate weighing scales have been designed such as that disclosed in Hem Patent No. 2,282,052 entitled "Testing Device for Determining Mass Distribution" whereby the operator may read from a dial the amount of weight to be removed from the respective end portions of the work-piece. The operator has then been required manually to adjust a machine tool to make the necessary metal removing cuts on such work-piece when the latter has been transferred thereto. The introduction of the human element into such weighing and machining operations necessarily invites error in both the reading of the dial or like recording means of the weighing instrumentality and also error in setting of such machine tool. Very large numbers of work-pieces such as connecting rods are commonly processed in a single day, and a great deal of expensive forging and machining work will already have gone into such work-pieces prior to reaching this stage in the manufacture. Consequently, any error now made in the removal of metal from the work-piece may result in rejection and scrapping of the same with a resultant substantial monetary loss.

Moreover, the work-piece has in the past required a careful preliminary machining operation in order to ensure that, when such work-piece is placed in the fixture of the milling machine or like machine tool and the latter manually set by the operator, a definite uniform starting point for the milling operation will be established and the desired amount of metal will be removed by the milling operation. This preliminary machining operation has also been relatively expensive inasmuch as upon the accuracy of the same will depend the accuracy of the weight or balance ultimately obtained in the final milling operation.

It is accordingly a primary object of our invention to provide a combined weighing and machining device which will remove substantially all possibility of human error in the operation of the same and will permit such operation to be controlled by relatively unskilled labor.

Another object is to provide a combined testing device and machine tool in which the setting of the milling or like metal-removing mechanism will be automatically controlled by the weighing mechanism when the work-piece is positioned on the latter.

Still another object is to provide a weighing and milling machine which will be thus automatically preset by operation of the weighing mechanism to make a milling cut or cuts on the work-piece to leave the proper amount of metal thereon affording the desired weight and balance without, as previously, being required first to establish a definite dimension on the work-piece by a preliminary machining operation to provide a definite fixed starting position for the final milling operation in order to remove a specific amount of metal.

A further object is to provide control means for a machine tool whereby the latter may automatically probe the work-piece properly to position the cutting tool to make the correct depth of cut without the necessity of previously machining the portion of the work-piece engaged thereby.

Other objects of this invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 4 is a fragmentary elevational view of the gauging means employed to determine the depth of cut of a hollow milling cutter adapted to operate upon one end portion of a work-piece such as a connecting rod or the like;

Fig. 11 is a vertical sectional view through the probe control means taken on the line 11—11 on Fig. 8;

Fig. 12 is an elevational view of the face mill quill-clamping means as viewed from the milling cutter end;

Fig. 15 is a vertical sectional view taken along the lines 15—15 on Fig. 13 and Fig. 14;

Fig. 16 is a fragmentary vertical sectional view taken along the line 16—16 on Fig. 14;

Fig. 17 is an end elevational view of the housing of such control means taken on the line 17—17 on Fig. 13;

Fig. 18 is a top plan view of the work holding fixture adapted to secure the work-piece during performance of the milling operations;

Fig. 19 is a front elevational view of such work holding fixture partly broken away to disclose the internal construction of the same;

Fig. 20 is a semi-diagrammatic sectional view of the face milling mechanism and control means therefor generally corresponding to Fig. 7 but with the parts somewhat rearranged better to facilitate understanding of their general interrelation;

Fig. 21 is a semi-diagrammatic sectional view to show the general interrelation and cooperation of the gauging mechanism and control means for the hollow milling cutter;

Fig. 22 is an elevational view of the selsyn and drive motor for presetting the hollow milling mechanism;

GENERAL CONSTRUCTION

Figure 1:
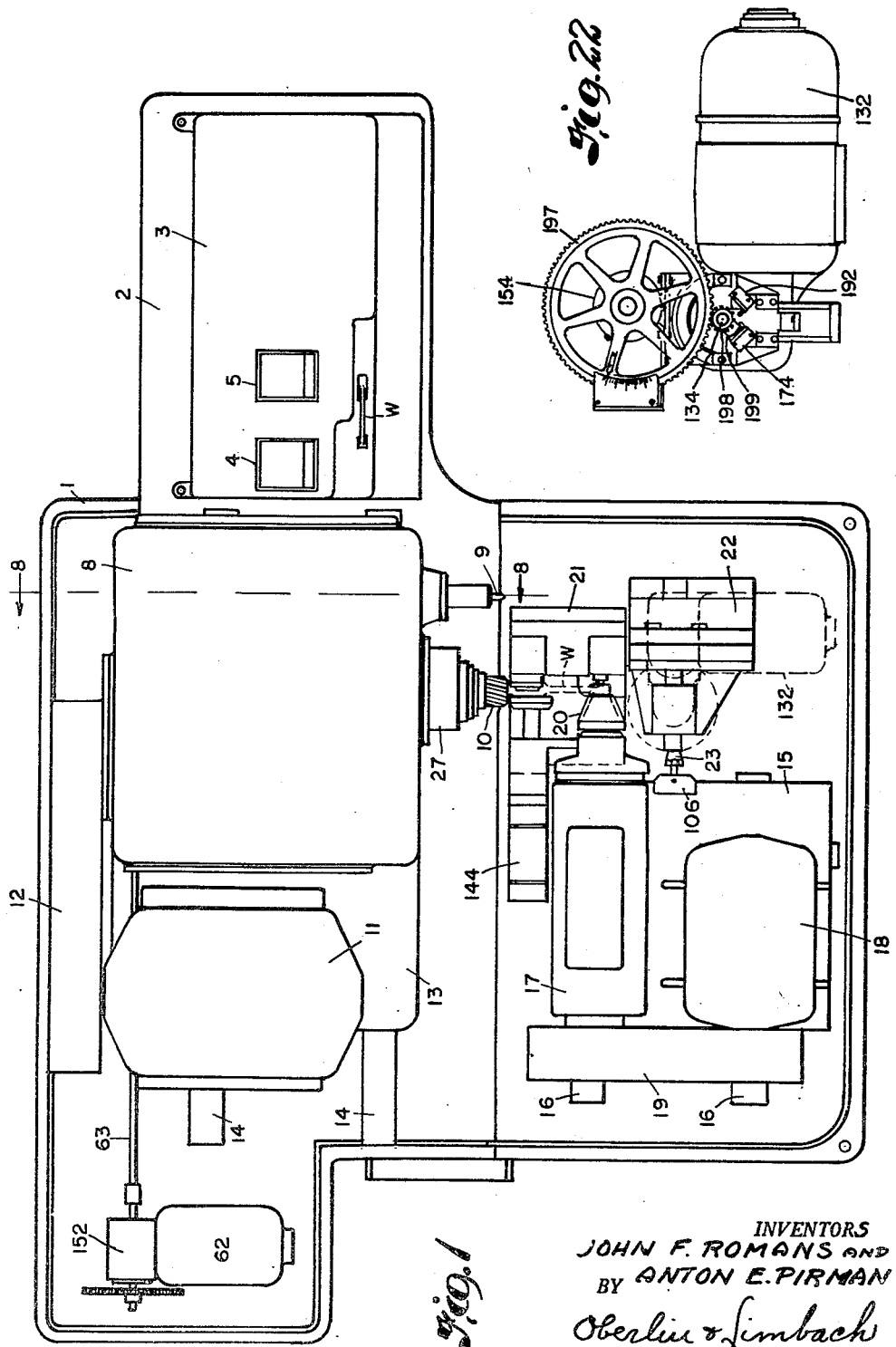
Fig. 1 is a top plan view of a combined weighing and milling machine constituting one embodiment of our invention.
Figure 2:
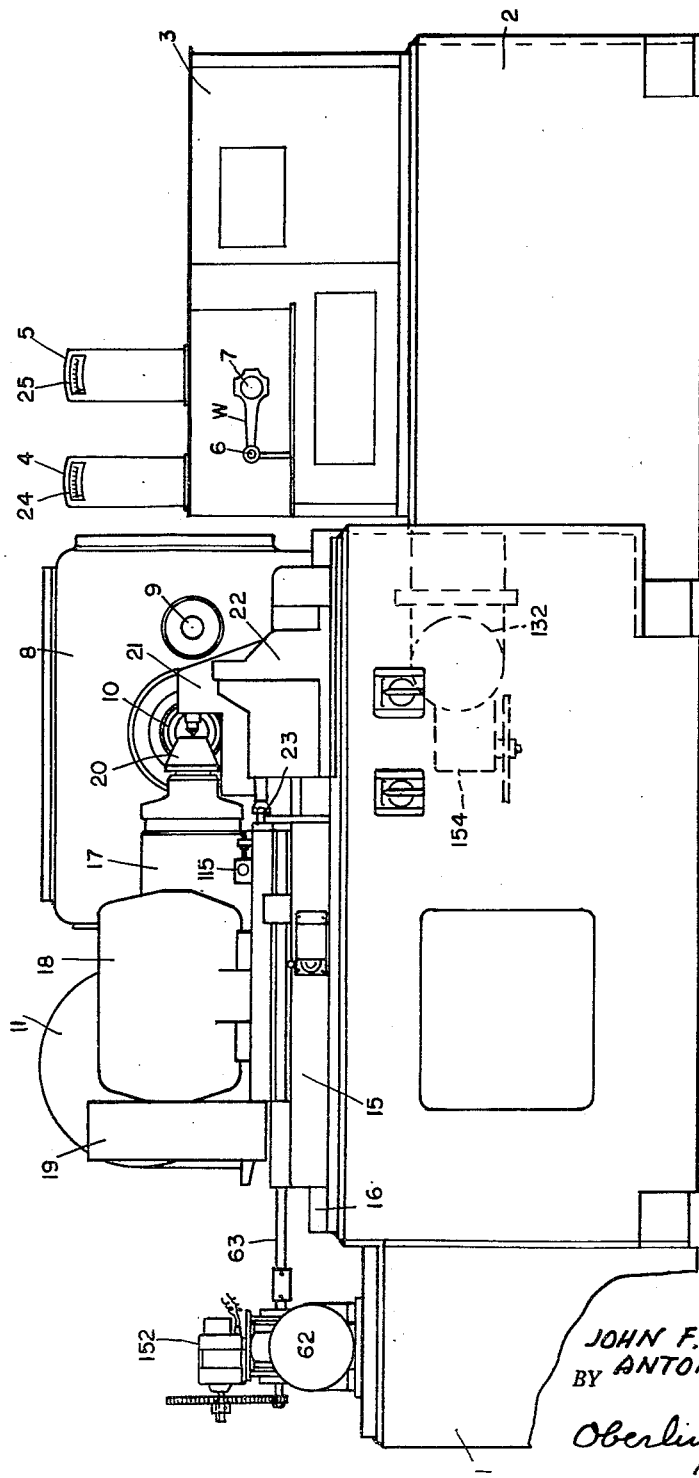
Fig. 2 is a front elevational view of the machine shown in Fig. 1.
Figure 3:
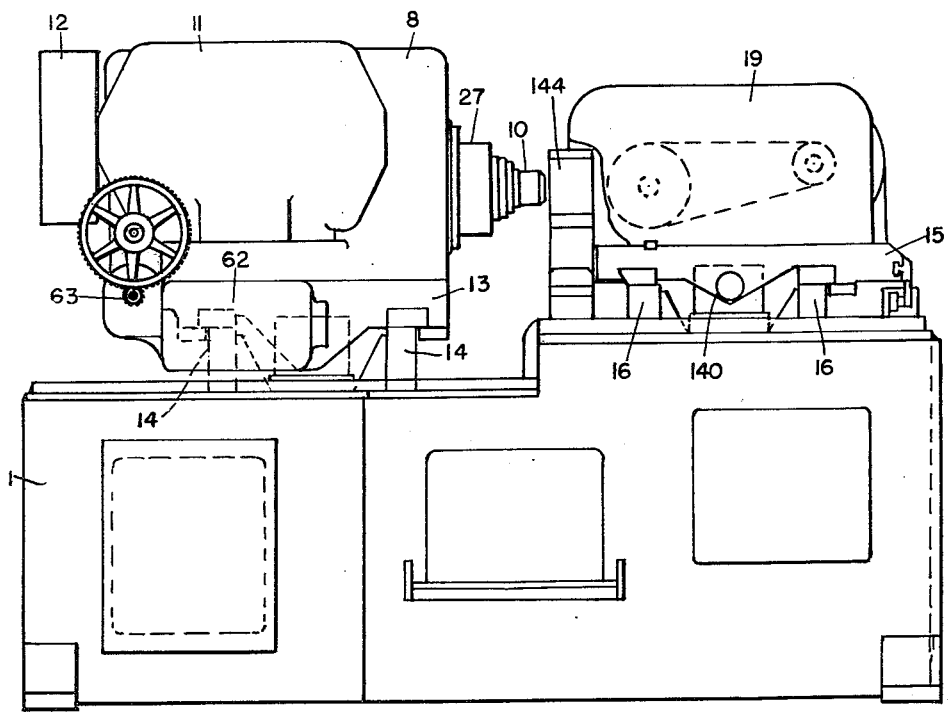
Fig. 3 is an end elevational view of such machine.

Referring now more particularly to Figs. 1, 2, and 3 of the drawing, the embodiment of our invention there illustrated comprises a welded box-like base 1 having a lateral extension 2 enclosing weighing scale mechanism of the type disclosed in the aforesaid U. S. Letters Patent No. 2,282,052. An upper housing 3 on such base 2 carries upwardly extending indicator casings 4 and 5 and a fixture including two work-piece supporting elements 6 and 7 adapted to have a work-piece such as connecting rod W temporarily mounted thereon.

Closely adjacent housing 3 on main base 1 is an upper housing 8 enclosing operating and control mechanism for probe 9 and face milling cutter 10. Such milling cutter is driven by electric motor 11 through drive means enclosed within guard 12, such housing 8 and motor 11 being carried together on a slide 13 mounted on ways 14 (see Figs. 3 and 8) for reciprocation toward and away from such scale housing 3.

Also carried by base 1 is a slide 15 mounted on ways 16 parallel to ways 14 and carrying hollow milling cutter housing 17. Such hollow milling cutter is driven by electric motor 18 likewise mounted on slide 15 through drive means enclosed in guard 19. Hollow milling cutter 20 thus projects in a direction normal to the axis of face milling cutter 10.

A work holding fixture 21 is mounted on base 1 to support the work W in position to be engaged by such two milling cutters. Adjacent thereto is the gauging mechanism 22 adapted to cooperate with adjustable stop 23 mounted on slide 15 to control the depth of cut of the hollow milling cutter 20.

GENERAL OPERATION

The scales are adjusted in the manner explained in Patent No. 2,282,052 by employment of a master connecting rod or other work-piece. Thereafter, when the operator places a work-piece upon elements 6 and 7 of the scales, the dial indicators 24 and 25 will show the amounts by which the crankshaft end and the wrist pin end of the connecting rod are overweight. In accordance with prior art practice, it would then be necessary for the operator to note such readings and properly to adjust the milling machines or other machine tools to remove the proper amount of metal from such respective ends of the connecting rod when the latter is transferred thereto. In accordance with the present invention, however, the operator may ignore the dial readings of the scales since such machine tools will automatically be preset through operation of selsyn means (described below) controlled by such scales. The operator need merely manually transfer the work-piece from the scales to the work holding fixture 21 where the same is firmly clamped in place. As soon as the work-piece is clamped, the slide 15 will advance a controlled distance and hollow milling cutter 20 carried thereby will automatically remove the proper amount of metal from the wrist pin end of the connecting rod. Simultaneously, probe 9 will advance from housing 8 and engage the crankshaft end of the connecting rod, face milling cutter 10 moving outwardly therewith. Upon completion of such probing operation, slide 13 carrying such housing and face milling cutter is traversed from left to right as viewed in Fig. 1 to cause such cutter to remove the proper amount of metal from the crankshaft end of the connecting rod, a small boss or protuberance having preferably been left on such end of the connecting rod for this purpose. It is obvious, of course, that the respective end portions of the connecting rod should not be underweight prior to the machining operations.

The slides automatically return to starting position (to the left as viewed in Fig. 1) and the work-piece is thereupon automatically unclamped for removal by the operator. As soon as probe 9 has moved into advanced position and slide 15 has returned, the operator may place another work-piece on the scales for weighing and presetting of the machine tool control means so that he may be ready to replace the finished work-piece removed from the clamping fixture with a minimum of delay.

Before explaining in detail the operation of our new machine, the various component units of the embodiment illustrated in the annexed drawing will first be described.

FACE MILLING UNIT

Now referring more particularly to Figs. 7–12 of the drawing, such unit comprises a spindle 26 journalled in a quill 27 mounted for limited reciprocation in housing 8. A key 28 engaging in keyway 29 holds such quill against rotation. Milling cutter 10 is carried by one end of such spindle and a gear 30 is keyed to the other end thereof. Meshed with such gear is a drive gear 31 of sufficient axial dimension to permit such reciprocation of quill 27 (see Fig. 7) and adapted to be driven through pulley 32, belts 33, and pulley 34 by motor 11, the belts and pulleys being enclosed within guard 12. A lubricant pump 35 may conveniently be mounted for operation by the same drive means.

Surrounding quill 27 is a split sleeve 36 clamped thereon by bolts 37 (Fig. 11) and keyed thereto by key 38. A laterally extending bracket 39 (Fig. 7) is cored at 40 to receive probe rod 41 for reciprocation therein parallel to quill 27. A key 42 fitting in keyway 43 holds such rod against rotation and a nut 44 serves to limit reciprocation of the rod. A heavy compression spring 45 encircling rod 41 is interposed between bracket 39 and collar 46 having a sliding fit on such rod, such spring tending to urge probe 9 outwardly to the extent permitted by nut 44.

Figure 9:
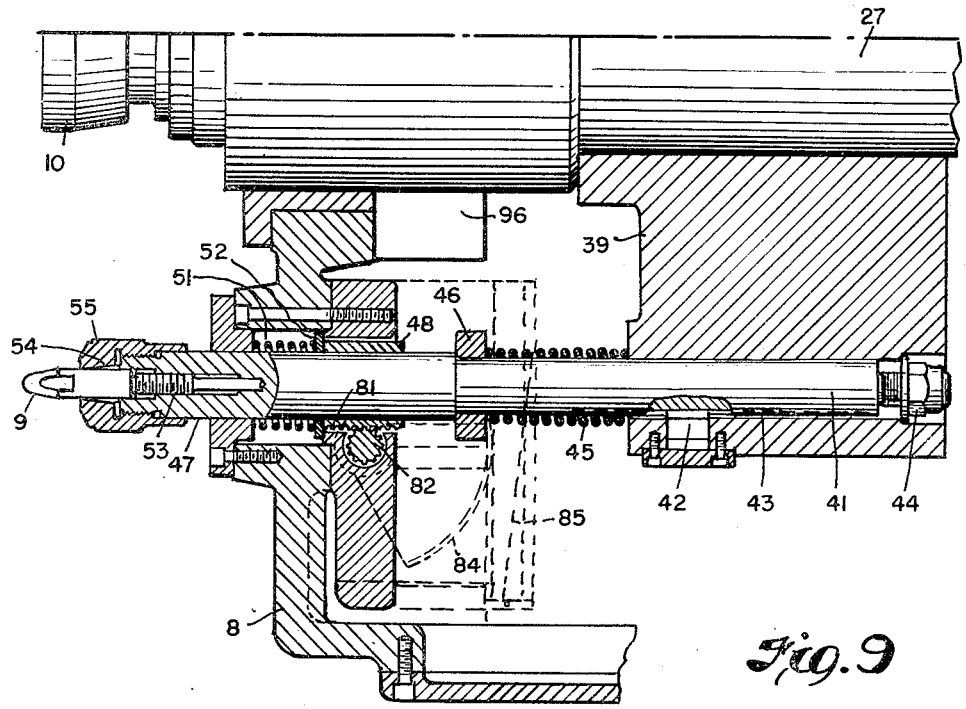
Fig. 9 is an enlarged sectional detail view of such probing mechanism similar to Fig. 7.

An outer extension 47 of rod 41, of somewhat greater diameter, passes through bushing 48 in bracket 49 mounted on the inner wall of housing 8 and then through an outer bearing 50. Bushing 48 is mounted for reciprocation relative both to extension 47 of the probe rod and to bracket 49. A compression spring 51, weaker than spring 45, engages collar 52 of such bushing 48 normally to hold the latter against bracket 49 as shown in Fig. 9, for example.

Probe 9 is threaded into socket 53 in the end of the probe rod for delicate axial adjustment, being secured in place by longitudinally slotted collet portion 54 and nut 55 in conventional manner.

Figure 8:
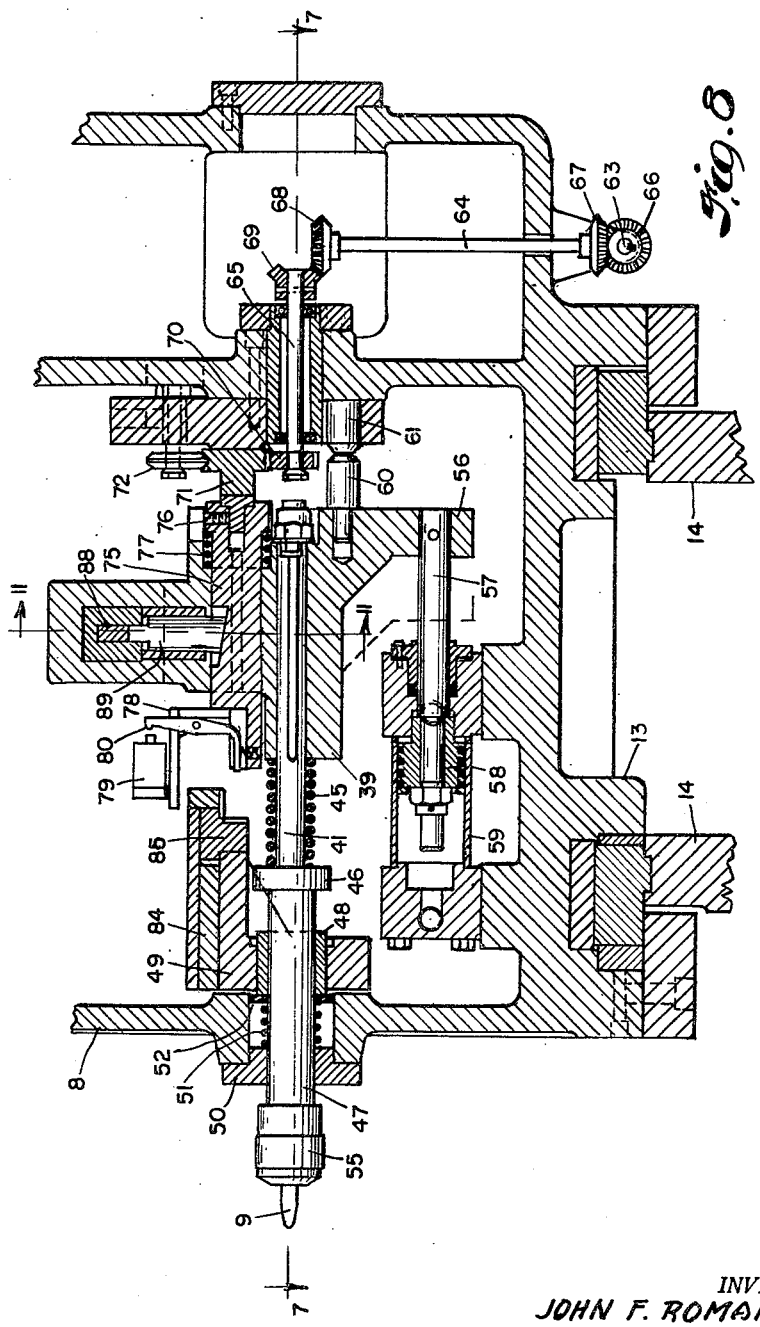
Fig. 8 is a vertical sectional view through such probing mechanism taken along the line 8—8 on Fig. 1.

A downward extension 56 of bracket 39 is secured to the end of piston rod 57 of a fluid pressure piston-cylinder assembly comprising piston 58 in cylinder 59 whereby such bracket, and therefore quill 27, may be reciprocated to the extent permitted in one direction by coacting stops 60 and 61 and in the other direction by control means now to be described (Fig. 8).

A selsyn controlled drive motor 62 (Fig. 1) operated in response to actuation of the scales supporting the crankshaft end of connecting rod W turns shaft 63 and thereby shafts 64 and 65 (Fig. 8) through bevel gearing 66, 67 and 68, 69. Gear 66 is slidingly keyed on shaft 63 to permit traversing of slide 13 on ways 14, housing 8 moving therewith. Shaft 65 has a pinion 70 keyed to its inner end (Figs. 7 and 8) engaging rack teeth on one side of a wedge member 71 supported for reciprocation by rollers such as 72, 73, 74, the inclined face of such wedge being presented towards probe rod carrying bracket 39. The adjustment of this wedge determines the amount of stock to be removed from the crankshaft end of the connecting rod.

A plunger 75 (Fig. 8) is mounted in and extends through bracket 39 parallel to and above probe rod 41, one end of such plunger being provided with an enlarged head 76 beveled to correspond to the slope of wedge 71 and juxtaposed thereto. A compression spring 77 interposed between said head and a shoulder of the bore in which plunger 75 is mounted tends to urge the plunger toward wedge 71. The other end of the plunger protruding from bracket 39 carries a stand 78 on which is mounted limit switch 79 and limit switch operating lever 80. The lower end of such lever normally projects slightly beyond this end of plunger 75 which is also beveled to correspond with a locating wedge means described below.

Figure 7:
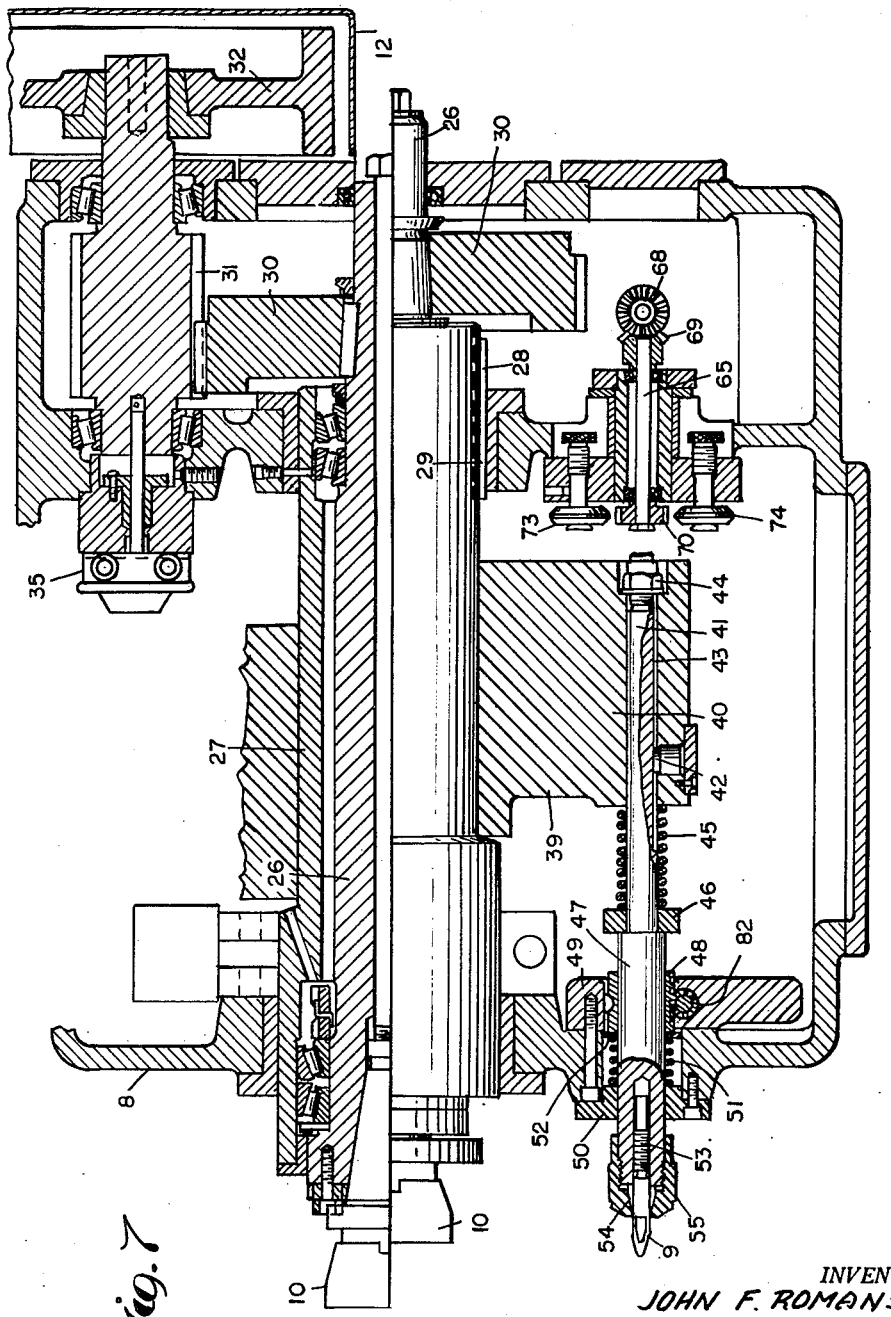
Fig. 7 is a horizontal sectional view through the face milling mechanism and associated probe adapted to operate upon the other end portion of such work-piece, taken along the line 7—7 on Fig. 8, the extreme axially shifted positions of the milling cutter quill being indicated.
Figure 10:
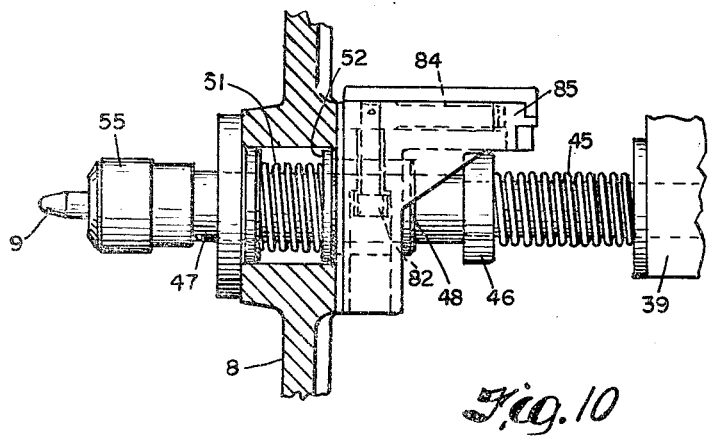
Fig. 10 is an enlarged elevational detail view of a portion of such probing mechanism similar to Fig. 8.
Figure 13:
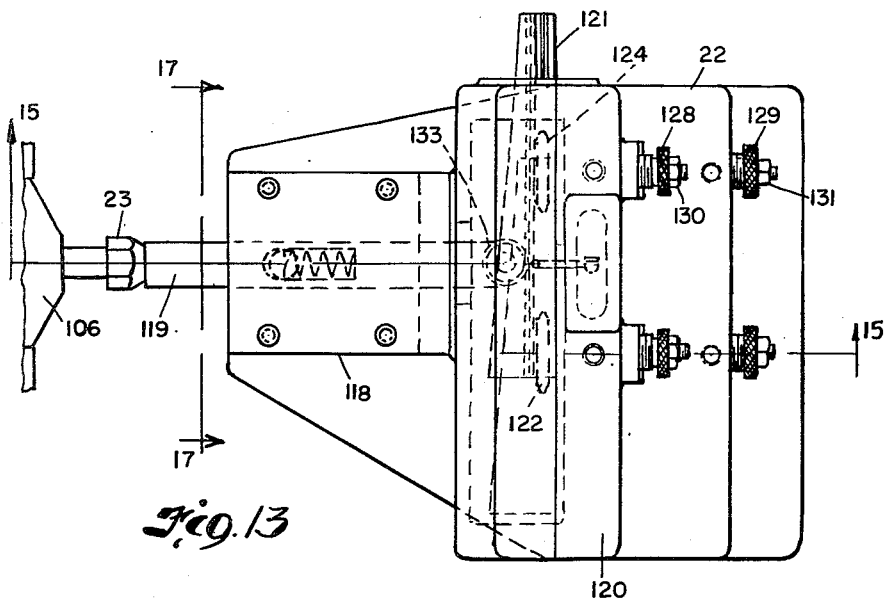
Fig. 13 is a top plan view of the gauge control means for the hollow milling cutter.
Figure 14:
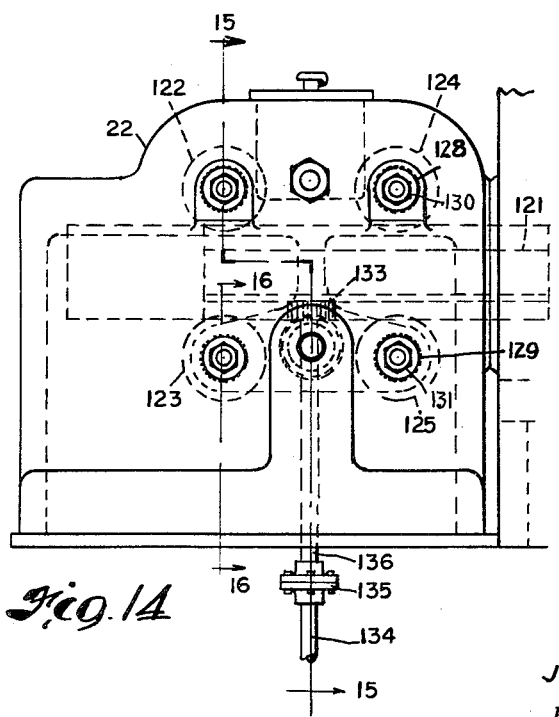
Fig. 14 is an end elevational view of such last-named control means.

Bushing 48 which is mounted for reciprocation against the force of compression spring 51 is provided with rack teeth 81 meshed with pinion 82 on vertically extending pinion shaft 83 journalled in bracket 49 (Figs. 7, 9 and 10). A gear segment 84 is keyed to the upper end of shaft 83 in engagement with rack teeth on the side of a locating wedge 85 mounted for reciprocation in bracket 49. The sloping face of such wedge is presented toward the correspondingly beveled end of plunger 75.

While stops 60, 61 serve to limit extreme return movement of bracket 39 and quill 27, the beveled end portion provided on head 76 of plunger 75 will in normal operation first engage wedge 71 pushing such plunger to the left, as viewed in Fig. 8, against the force of spring 77. Before the piston-cylinder assembly 58, 59 now operates to advance bracket 39 and the associated parts carried thereby, control means (described later in connection with the detailed operation of the machine) actuates fluid pressure piston-cylinder assembly 86, 87 to shift wedge 88 to force beveled plunger 89 downwardly into locking engagement with a correspondingly beveled relieved area on the side of plunger 75 (see Figs. 8 and 11). Plunger 75 is accordingly prevented from shifting to the right, as viewed in Fig. 8, when bracket 39 is reciprocated to the left away from stock removal control wedge 71. Such fluid pressure piston-cylinder assembly 86, 87 and associated parts are all mounted on and travel with bracket 39 and quill 27.

When a connecting rod is placed on the scales, the slightly overweight crankshaft end of the same will cause shaft 63 to be rotated to shift stock removal control wedge 71 accordingly. After the operation of the scale and the selsyn control means have caused the stock removal wedge 71 to be shifted, contacts controlled by the weighing unit will be closed causing piston 58 to be shifted to the right (Fig. 8) until stops 60 and 61 engage. Plunger 75 is thereby forced to the left relative to bracket 39 to an extent depending on the setting of wedge 71, and plunger 89 is brought down to hold plunger 75 in this position (spring 77 urging plunger 75 to the right).

After the connecting rod has been transferred to the clamping fixture 21, the operator will press the "start" button to cause piston 58, and therefore bracket 39, to be shifted to the left, advancing both probe 9 and milling cutter 10. When collar 46 on probe rod 41 engages bushing 48, just before probe 9 contacts the end of the connecting rod, such bushing will be shifted to the left since spring 45 is stronger than spring 51. Such shifting of bushing 48 (for a short distance only, since probe 9 soon contacts the work) rocks gear segment 84 to reciprocate locating wedge 85, such reciprocation ceasing the moment probe 9 contacts the work. Probe rod 41 is now likewise incapable of further advance and continued travel of bracket 39 and milling cutter quill 27 is only permitted by compression of spring 45 until the forward end of plunger 75 engages locating wedge 85. This rocks lever 80 to actuate limit switch 79 which controls operation of fluid pressure piston-cylinder assembly 90, 91 (Fig. 12) carried by a quill clamping member 92 bolted to the inside of housing 8. A wedge 93 is reciprocated by such piston and bears against roller 94 mounted on rod 95 extending downwardly through upper clamping member 92 and lower clamping member 96 pivotally connected thereto at 97. A compression spring 98 surrounding rod 95 and interposed between such clamping members normally urges the latter to unclamped position, and nuts 99 on the end of rod 95 engage the underside of member 96. Such operation of piston-cylinder assembly 90, 91 accordingly serves to clamp the milling cutter quill firmly in housing 8 and the latter may now be traversed on its ways to make the cut.

HOLLOW MILLING UNIT

Now referring more particularly to Figs. 1, 2 and 21, the hollow milling cutter 20 is driven in conventional manner by electric motor 18 through pulley 100, belting 101, pulley 102, gears 103 and 104, and spindle 105 journalled in housing 17. The slide 15 supporting such housing is adapted to be reciprocated on ways 16 to advance cutter 20 into the wrist pin end of the connecting rod clamped in fixture 21, such cutter being positioned to engage an annular boss concentric with the wrist pin opening.

Figure 4:
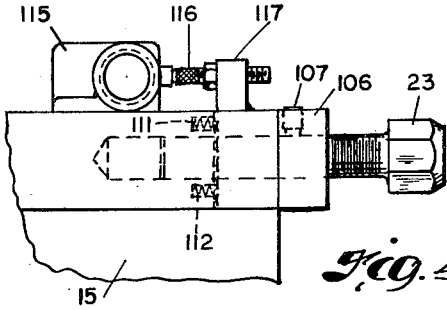
Figure 5:
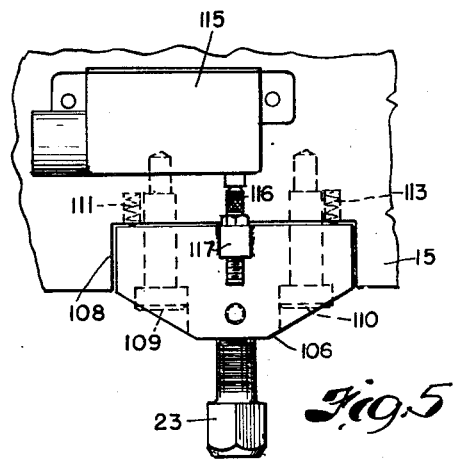
Fig. 5 is a top plan view of the gauge mechanism of Fig. 4.
Figure 6:
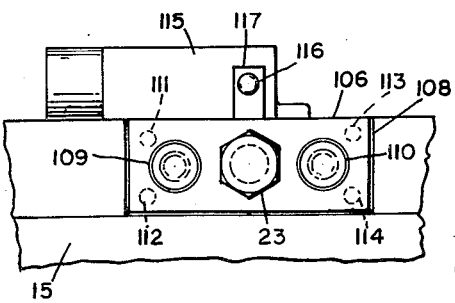
Fig. 6 is an end elevational view of such gauging mechanism.

As best shown in Figs. 4, 5 and 6, the gauging stop 23 is mounted in slide 15 for very limited reciprocation relative thereto. Such stop comprises a screw threaded into block 106 and secured in adjusted position therein by means of set screw 107. Block 106 is mounted for limited reciprocation in a recess 108 in the upper edge of slide 15, being secured therein by means of studs 109 and 110 threaded into slide 15 and having enlarged heads limiting outward movement of block 106 and stop 23. Four uniformly arranged compression springs 111, 112, 113 and 114 urge block 106 outwardly against the heads of studs 109 and 110. A micro-switch 115 is mounted on the upper surface of slide 15 directly behind block 106 for engagement and actuation by screw 116 carried in upstanding bracket 117 on the upper surface of block 106. Screw 116 will be adjusted and locked in bracket 117 in position to engage micro-switch 115 without actuating the latter when block 106 is held against the heads of studs 109 and 110 by the aforesaid compression springs. Thus, when stop 23 engages an immovable object, it will cause block 106 to be moved inwardly an extremely slight distance just sufficient to actuate micro-switch 115.

The gauging mechanism 22 (Figs. 1, 2, and 13–17 inclusive) comprises a stand 118 in which plunger 119 is mounted for reciprocation axially of stop 23 and another stand 120 housing the control mechanism adapted to determine the position of such plunger. A stock removal control wedge 121 is supported between rollers 122, 123, 124 and 125 for reciprocation transversely of the inner end of plunger 119, the inclined face of such wedge being presented toward the end of the plunger which is likewise beveled to correspond thereto. As in the case of the rollers which support stock removal control wedge 71 of the face milling unit described above, such rollers engage in shallow grooves in the corresponding sides of the wedge member. Referring now particularly to Figs. 15 and 16 of the drawing, it will be noted that such rollers 122—125 are mounted on slightly eccentric bearings on spindles within threaded bushings such as 126 and 127 provided with enlarged knurled ends 128 and 129 whereby the corresponding rollers may be adjusted in and out as desired. The spindles are locked with the eccentric bearings in desired position by means of nuts 130 and 131 threaded on the ends of such spindles.

A selsyn controlled drive motor 132 exactly similar to motor 62 (Figs. 1 and 22) is mounted in base 1 of the machine beneath the gauging mechanism 22 to drive pinion 133 through shaft 134, coupling 135, and shaft 136 (Fig. 15). Such pinion engages corresponding rack teeth on wedge member 121 to shift the latter back and forth in accordance with the operation of electric motor 132. A compression spring 137 within stand 118 bears against finger 138 extending downwardly from plunger 119 to urge the latter toward stop 23. Such spring 137 is, however, considerably weaker than the sum total effect of springs 111—114 which urge stop 23 outwardly.

When the connecting rod is placed upon the scales, the overweight wrist pin end of the latter actuates mechanism operating through selsyn means (more particularly described in connection with the explanation of the detailed operation of the machine set forth below) to drive motor 132 to shift wedge 121 to determine the amount of metal to be removed by the hollow milling cutter. The operator transfers the connecting rod to the work clamping fixture 21, and after the connecting rod has been firmly clamped therein the operator presses the "start" button to cause the hollow milling cutter to be fed forward. Piston 139 is reciprocated in cylinder 140 to advance slide 15 carrying the hollow milling unit and the stop 23 (Fig. 21). When stop 23 engages the outer end of plunger 119, such plunger is pushed in thereby against the action of relatively weak compression spring 137 until the inner end of such plunger engages wedge 121. The plunger now being rigid against further reciprocation, stop 23 is moved inwardly slightly against the action of springs 111—114 to actuate micro-switch 115 controlling the supply of fluid pressure to cylinder 140 and reversing the action of the latter to return slide 15 and the hollow milling cutter carried thereby.

WORK HOLDING FIXTURE

Referring now more particularly to Figs. 18 and 19 of the drawing, the work holding fixture 21 which is adapted to position and clamp the connecting rod during the milling operations comprises a stand 141 provided with two spaced work positioning plugs 142 and 143 adapted to fit in the crankshaft hole and the wrist pin hole respectively of a connecting rod W. Opposed to plug 142 is a fluid pressure piston-cylinder assembly 144, the piston rod 145 of which carries at its end a clamping member 146 adapted to engage the work and hold the same firmly in position on plug 142.

A plunger 147 is mounted below and parallel to plug 143 provided with a compression spring 148 urging the same outwardly. Mounted beneath such plunger is a micro-switch 149 provided with an upwardly extending operating lever 150 adapted to engage a shoulder of plunger 147 for operation by the latter when such plunger is pushed inwardly against spring 148 by a work-piece properly clamped in place in the fixture. This micro-switch is included in the milling units operating circuits (Fig. 25) so that such milling units cannot be actuated until the work-piece has been properly clamped.

DETAILED OPERATION

It will be apparent from the foregoing that an explanation of the detailed operation of our new machine may conveniently be divided into two parts, namely the automatic setting of the respective stock removal control wedges 71 and 121 when the work-piece is placed upon the scales and the operation of the two milling units when such work-piece has been transferred to the work holding fixture 21.

*Operation of stock removal control means*

Scales of the type disclosed in Hem Patent No. 2,282,052 are commercially available from Toledo Scale Company of Toledo, Ohio, and the details of construction and operation of the internal mechanism of such scales are accordingly no part of the present invention. It is only necessary to understand that when a work-piece such as a connecting rod is placed upon such scales indicator pointers will be rocked about their axes on respective dials to show the amount of overweight of the corresponding ends of the connecting rod.

Figure 23:
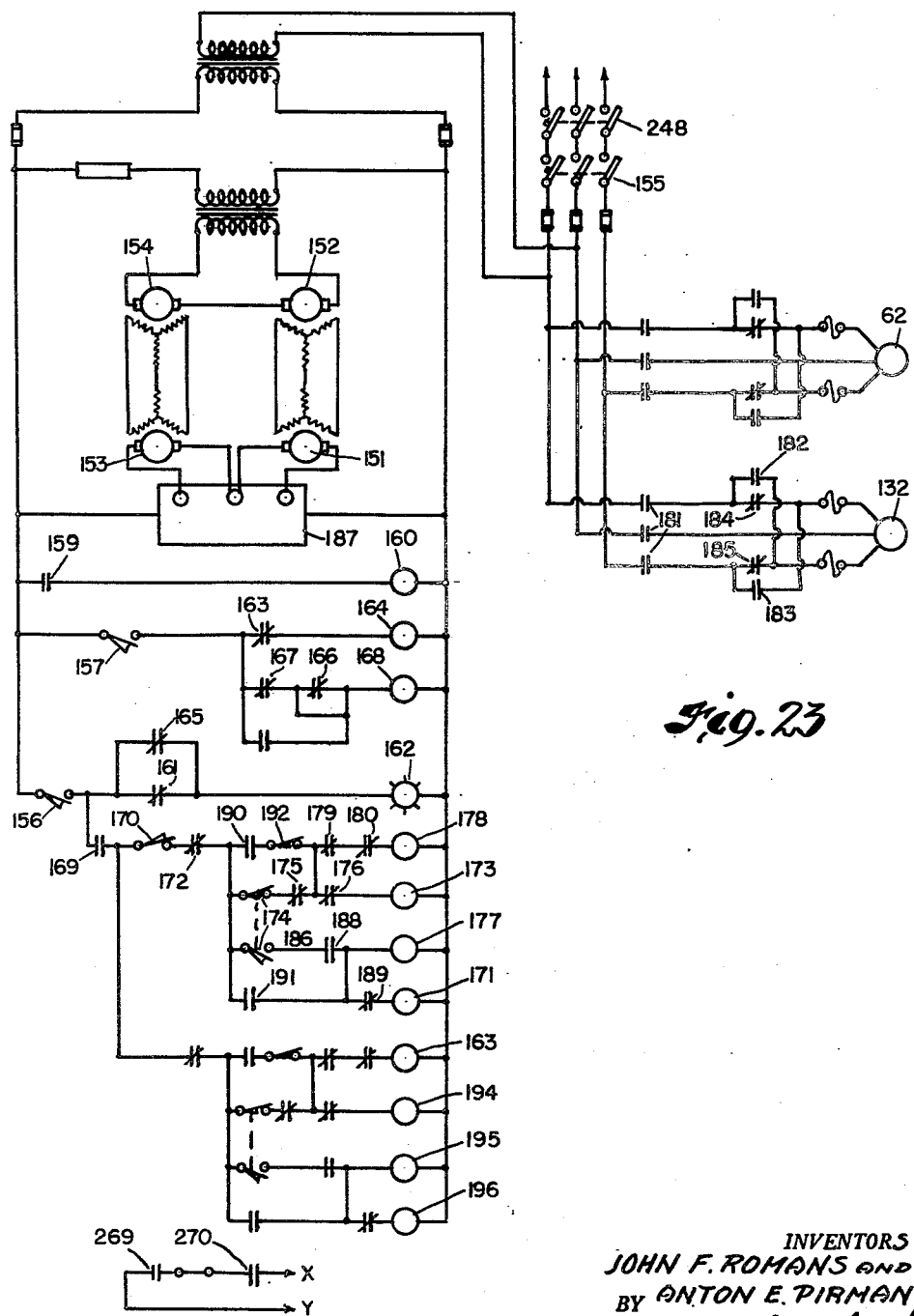
Fig. 23 is a wiring diagram of the electric circuit interconnecting the weighing machine and the selsyn controlled drive motors for the milling machine control means.

Referring now to Fig. 23 of the drawing, we mount a selsyn 151 for rotation by such oscillation of the stub shaft or other member at the axis of rotation of the dial indicator pointer of the scale supporting the crankshaft end of the connecting rod. Such selsyn 151 is directly connected with selsyn 152 associated with stock removal wedge adjusting motor 62. Similarly, selsyn 153 is mounted for rotation by oscillation of the stub shaft or other member at the axis of rotation of the dial indicator pointer of the scale supporting the wrist pin end of the connecting rod and is operatively connected with selsyn 154 associated with stock removal wedge adjusting motor 132. Disconnecting switch 155 is normally closed to energize motors 62 and 132 and selsyns 151—154.

Figure 26:
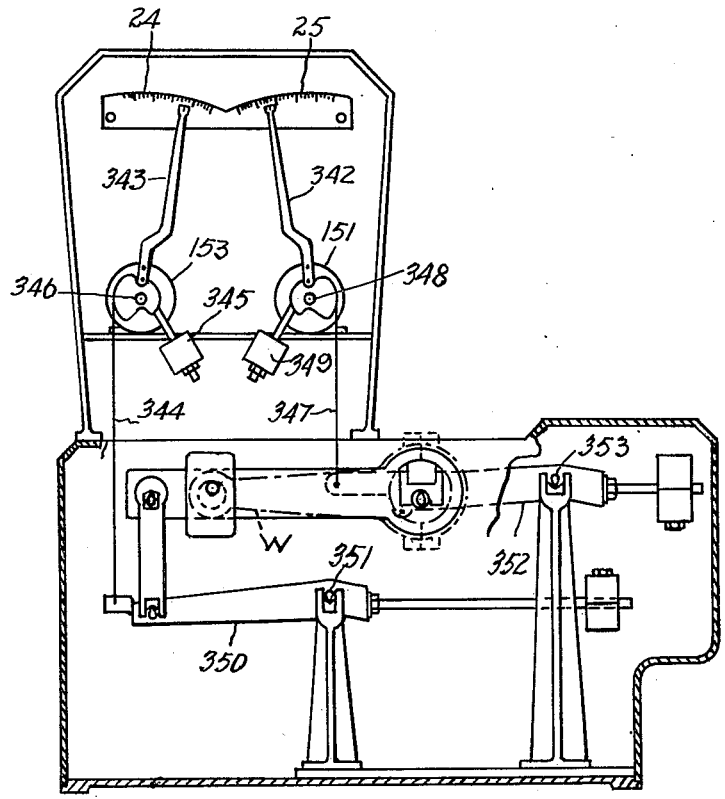
Fig. 26 is a simplified view of one form of weighing mechanism commercially available and suitable for our purpose.
Figure 27:
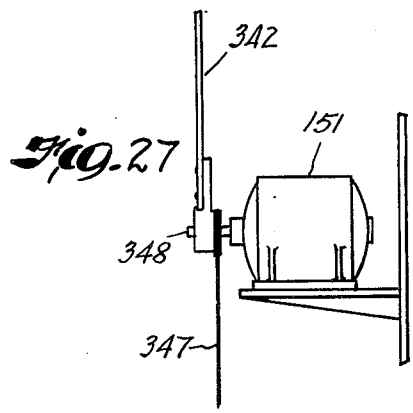
Fig. 27 is a side elevational view of one indicator means of such weighing mechanism together with an associated selsyn.

To facilitate understanding of the operation of the weighing mechanism, reference may also be had to Figs. 26 and 27 of the drawing, the former showing in somewhat simplified form the basic elements of the scale disclosed in Hem Patent 2,282,052, commercially available from Toledo Scale Company of Toledo, Ohio. The scale pointers 342 and 343 are mounted to turn with selsyns 151 and 153 respectively when the work-piece W is placed upon the scales, the pull on cable 344 overcoming the effect of counterweight 345 to turn stub shaft 346 with the pull on cable 347 similarly turning stub shaft 348 in opposition to the effect of counterweight 349. The other end of cable 344 is connected to lever 350 mounted for oscillation on knife edge 351 and cable 347 is similarly connected to the end of lever 352 mounted on knife edge 353. Accordingly, when the work-piece is placed upon the scales and pointers 342 and 343 moved under the effect thereof, the corresponding selsyns 151 and 153 will likewise be correspondingly rotated with the result explained below.

The operator places the connecting rod to be weighed upon the scales, thereby closing limit switch 156 to set up the selsyn control circuit. Before completion of the weighing operation can take place, limit switch 157 must have been closed by advance of quill 27, carrying the face milling cutter 10, bracket 39 and plunger 75 away from stock removal control wedge 71, since of course no change can be made in the position of the stock removal control wedge while plunger 75 is contacting the same. Likewise, when slide 15 carrying the hollow milling cutter 20 has advanced its full predetermined distance to make the proper cut in the preceding work-piece, stop plunger 23 is depressed to close micro-switch 115, energizing time delay relay 158 which instantaneously closes contacts 159 to energize relay 160, closing contacts 161. Since switch 156 has previously been closed as above described, red lamp 162 is accordingly now illuminated to warn the operator that the weighing operation is taking place and not to disturb the work-piece. The closing of limit switch 157 completes the circuit through normally closed contacts 163 to energize relay 164 which in turn closes contacts 165, which are also effective to complete the circuit to lamp 162 so that either the full forward advance of quill 27 or the full advance of slide 15, whichever takes place first, is operative thus to illuminate warning lamp 162.

Such energization of relays 160 and 164 also is effective to close their respective contacts 166 and 167, energizing relay 168. Relay 168 operates to close normally open contacts 169 to set up the control circuit for the wedge drive motors 62 and 132.

Before the selsyn control means for drive motor 132 can be energized, it is necessary for slide 15 to have returned sufficiently to withdraw hollow milling cutter 20 from the work, such extent of withdrawal being sufficient to return limit switch 170 to normally closed position (Fig. 21). Relay 160 which has been energized as above described is a latch relay and is operative to release relay 171, closing contacts 172. Relay 173 is accordingly now energized through normally closed switch 174 and normally closed contacts 175 and 176 of relay 177. Likewise, relay 178 is simultaneously energized through normally closed overload contacts 179 and 180. Such energization of relay 178 operates to close normally open contacts 181 to energize drive motor 132. Since relay 173 has already been energized, normally open contacts 182 and 183 are now closed and contacts 184 and 185 are opened to operate motor 132 in reverse. Reverse operation of motor 132 is operative to retract wedge 121 and return selsyn 154 to its zero position.

When selsyn 154 has thus been returned to zero position, its trips limit switch 174 simultaneously closing contacts 186 of such switch. Such opening of switch 174 serves to de-energize relay 173 and relay 178, opening contacts 181 and stopping motor 132.

The off-balance pin end of the connecting rod which has been placed upon the scales will have caused selsyn 153 to be rotated out of correspondence with selsyn 154 which has now been returned to zero position as above explained. The current generated in selsyn 153 as a result is amplified by electronic two-stage amplifier 187 (commercially available from General Electric Company), closing contacts 188 of such amplifier and opening contacts 189 also in the amplifier. Closing of contacts 188 now energizes relay 177 to close contacts 190 and 191. Such closing of contacts 190 is effective to energize relay 178 through normally closed limit switch 192 and normally closed contacts 179 and 180, and relay 178 consequently now again closes contacts 181 to energize motor 132 in a forward direction through normally closed contacts 184 and 185. Drive motor 132 therefore now operates to advance wedge 121 until selsyn 154 is brought into correspondence with scale selsyn 153. When selsyns 153 and 154 are thus brought into correspondence, current will no longer be generated in selsyn 153 so that contacts 188 of amplifier 187 now open and contacts 189 return to normally closed position, energizing relay 171 and de-energizing relay 177. Such energization of relay 171 opens normally closed contacts 172, thereby also de-energizing relay 178 to open contacts 181. Drive motor 132 consequently stops, leaving wedge 121 in properly predetermined position to control the depth of cut to be made by milling cutter 20.

The circuit including relays 193, 194, 195 and 196 is an exact duplicate of that above described, being controlled, however, by selsyns 151 and 152 to drive motor 62 to position wedge 71 and thereby determining the extent quill 27 will be advanced. Energization of such latter circuit takes place simultaneously with energization of the circuit controlled by scale selsyn 153 except that it is not necessary that switch 176 be closed. Consequently, under some circumstances, it is possible to preset control wedge 71 before the circuit is set up to permit presetting of control wedge 121. This is feasible because control wedge 71 will already have performed its function as soon as quill 27 begins to advance whereas control wedge 121 must be retained in its predetermined position until completion of the hollow milling operation. Wedge 71 will be shifted from its normal starting or zero position in an upward direction as viewed in semi-diagrammatic Fig. 20 since the work-pieces will ordinarily intentionally be made slightly overweight for purposes of such subsequent balancing operation. Should a work-piece be exactly in balance, wedge 71 would remain at zero position and the end of probe 9 and the end of cutter 10 would be in the same plane after the quill has moved forward. Upon reciprocation of the carriage, the cutter would then just fail to take a cut.

As above explained, when wedge 121 has been shifted to proper position, relay 171 is energized to open normally closed contacts 172 and also opens normally closed contacts 161. Similarly, when wedge 71 has been shifted to properly adjusted position, relay 196 is energized to open contacts 165. Since contacts 161 and 165 are thus now open, the circuit to lamp 162 is interrupted and such lamp goes out, notifying the operator that he may now remove the work-piece from the scale and place the same in the work-clamping fixture 21.

The mechanism through which the selsyns associated with the respective drive motors are driven and controlled is illustrated in Fig. 22 of the drawing to which reference may now be had. Such figure shows the selsyn and drive motor assembly for driving shaft 134 (a similar assembly being employed to drive shaft 63). Selsyn 154 is provided with a gear 197 meshing with gear 198 on shaft 134 which is driven by reversible motor 132. A cam 199 also mounted on shaft 134 is operative to trip limit switches 174 and 192. Such latter switch 192 is merely a safety switch becoming operative when, through some malfunction of the circuit, cam 199 is caused to revolve beyond its normal operating arc. When engaged by such cam, switch 192 will be opened, thereby de-energizing relay 178 and opening contacts 181 of drive motor 132. This, of course, merely serves to prevent wedge 121 from being shifted beyond its permitted limits which would result in the burning out of motor 132.

*The hydraulic system for operation of the respective milling cutters and work clamping fixture*

Figure 24:
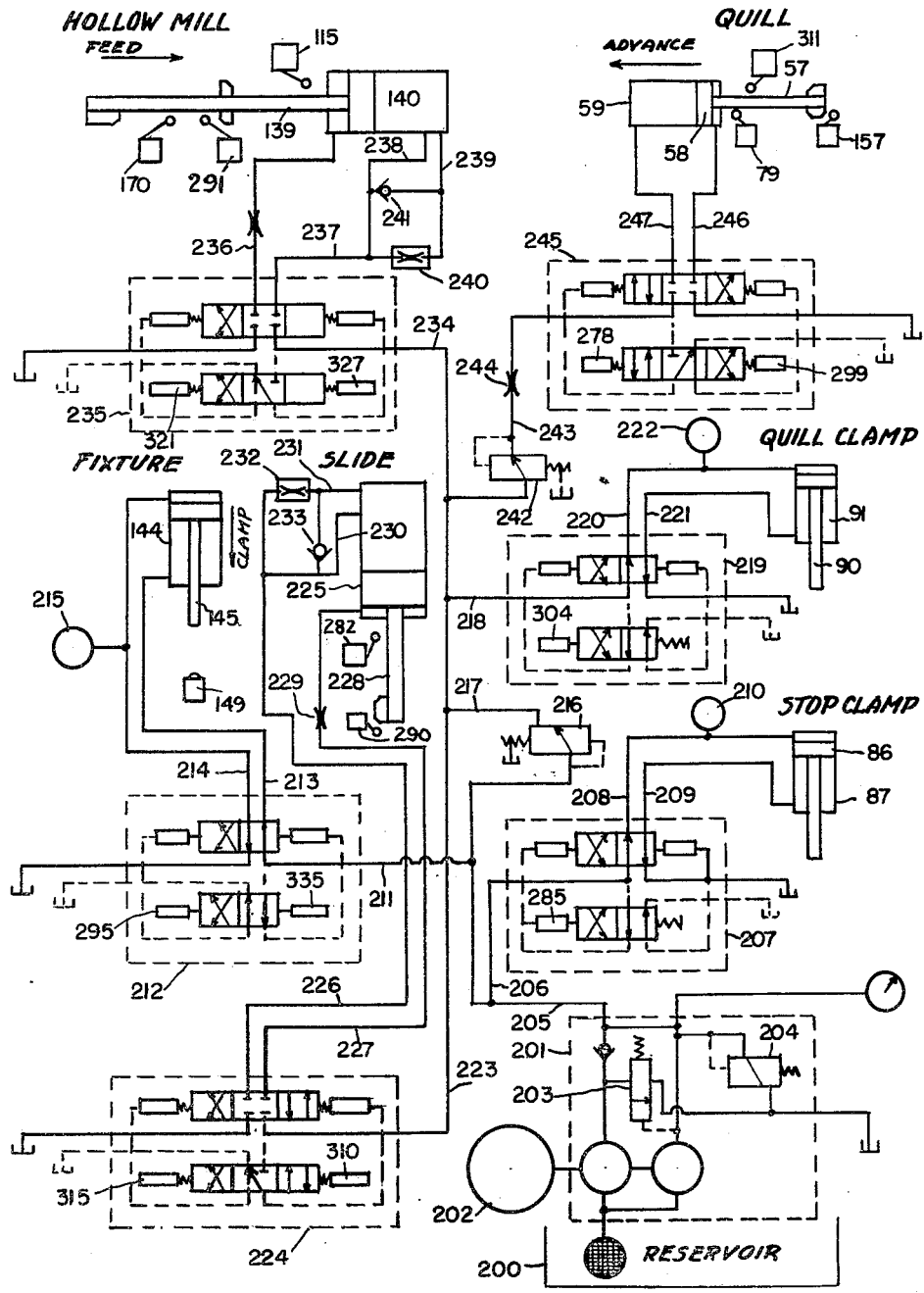
Fig. 24 is a schematic diagram of the fluid pressure system for cooperation of the two milling machines and work clamping mechanism.

Before explaining the detailed operation of the respective milling cutters and work clamping fixture, it will be desirable first briefly to describe the fluid pressure system utilized, and reference may be had to Fig. 24 of the drawing for this purpose.

Hydraulic fluid is drawn from reservoir 200 by double pump 201 driven by motor 202, such pump being provided with integral pressure regulating valves 203 and 204 to maintain the desired uniform pressure in main line 205. Since such pump and valve unit is well known in the art and commercially available, it need not be further described. Fluid is supplied from main line 205 to branch line 206 leading to single solenoid spring offset pilot-operated four-way valve 207 which is adapted to supply such fluid pressure to the respective ends of cylinder 87 through lines 208 and 209. When pressure is supplied to line 208 to advance piston 86 in cylinder 87 to clamp plunger 75 in the position determined by wedge 71, pressure will then build up in line 208 to operate pressure switch 210 for a purpose to be explained below.

Pressure from main line 205 is also supplied to branch line 211 to double solenoid pilot-operated, two-position, four-way valve 212, supplying oil to fixture cylinder 144 through lines 213, 214. When piston 145 has been advanced through introduction of fluid pressure to line 214 to clamp the work in fixture 21, pressure will build up in such line to operate pressure switch 215 for a purpose to be explained below.

Oil is also supplied from main line 205 to sequence valve 216 which maintains a predetermined pressure in line 205, admitting only excess fluid to line 217. This ensures that the work will be properly clamped before any milling operation takes place and that plunger 75 will remain clamped in its adjusted position despite drain of hydraulic fluid for other later operations. Oil is supplied from line 217 through line 218 to valve unit 219 identical in arrangement with valve unit 207. Such valve unit controls flow of fluid to the respective ends of cylinder 91 through lines 220 and 221. Pressure in line 220 advances piston 90 to clamp quill 27 in proper advanced position. Pressure build-up in such line 220 after clamping operates pressure switch 222 for a purpose explained below.

Fluid from line 217 is also supplied through line 223 to four-way double-solenoid pilot-operated spring-centered three-position valve 224 which controls flow to cylinder 225 through lines 226 and 227 to reciprocate piston 228 to traverse face-milling cutter slide 13. Pressure in line 227 through speed control valve 229 to the rod end of cylinder 225 traverses slide 13 toward the work, oil being thereby forced from cylinder 225 through line 230. When piston 228 closes cylinder port of line 230, oil is then forced out through line 231 through adjustable flow control valve 232 to reduce the rate of further traverse of slide 13 during the actual machining operation. Rapid return means comprising a check valve 233 bypassing such flow control valve is provided for return of the slide.

Fluid is supplied from line 217 through line 234 to valve assembly 235 similar in construction to valve assembly 224. Valve 235 controls flow of oil to cylinder 140 through lines 236 and 237. Admission of fluid pressure to such cylinder through line 236 causes slide 15 to be traversed toward the work. Closing of cylinder port in line 238 causes oil to be discharged through line 239 through adjustable flow control valve 240, controlling the rate of feed. A check valve 241 is also provided to by-pass valve 240 for rapid return.

From line 217 oil is supplied to adjustable pressure-reducing valve 242 to line 243 through flow-control valve 244 to four-way valve 245 similar to valve 224. Valve 245 controls flow of oil to quill-advancing cylinder 59 through lines 246 and 247. Pressure-reducing valve 242 permits the pressure supplied to cylinder 59 to be regulated to a working minimum so that a minimum deflection of the parts will be produced.

*Electrical control means for hydraulic system*

Referring now to electrical schematic diagram Fig. 25, the manner in which the operation of the two milling machines (Figs. 20 and 21) and the work clamping fixture (Figs. 18 and 19) is controlled will now be described.

When main disconnect switch 248 is closed, current is supplied through transformer 249 to lines 250, 251, 252 and 253. Upon closing push button 254, master relay 255 and motor starter 256 are energized. Master relay 255 closes contacts 257, 258, 259 and 260, allowing current to pass to the main control circuits. Energization of motor starter 256 closes contacts 261, starting hydraulic pump motor 202. Pressing of push button 262 now energizes motor starters 263 and 264, closing contacts 265 and 266, and thereby starting face mill drive motor 11 and hollow mill drive motor 18.

A stop button 267 is provided to interrupt the circuit to stop motors 11 and 18 while permitting continued operation of the hydraulic pump motor 202. Stop button 268 is provided to stop motors 11, 18 and 202.

The stock removal control wedges 71 and 121 will have been properly positioned as explained above in the section entitled "Operation of stock removal control means," and when lamp 162 goes out the operator may thereupon transfer the work-piece from the scale to the work clamping fixture.

Since relays 171 and 196 have been energized as above described, they close contacts 269 and 270 (Fig. 23) of a branch circuit bridging contacts 271 of limit switch 272 which was released when quill 27 was withdrawn part way. This completes the circuit through contacts 273 of pressure switch 222 and through normally closed contacts 274 of relay 275, energizing relay 276. Energization of such relay 276 closes contacts 277 energizing solenoid 278 of four-way valve 245 to admit fluid pressure to line 247 of cylinder 59 and thereby shift piston 58 fully to return quill 27 to the extent permitted by stops 60 and 61, with the end 76 of plunger 75 accordingly being brought into engagement with stock removal control wedge 71.

As previously explained, it now becomes necessary to clamp plunger 76 in its adjusted position as determined by wedge 71 before again advancing the quill, so that the end of such plunger bearing limit switch 79 will be retained in its corresponding adjusted position relative to wedge 85. Limit switch 157 has already been tripped to close the same, thereby energizing time-delay relay 279 (which includes pneumatic timer of well-known design), delaying the opening of contacts 280 and thereby allowing such quill to complete its full return movement as above described before de-energization of relay 281 takes place, such latter relay controlling the clamping of plunger 76 in its adjusted position. The circuit including relay 281 has previously been energized through completion of the milling traverse of slide 13, the tripping of limit switch 282 thereby having closed normally open contacts 283. The opening of contacts 280 de-energizes relay 281, opening contacts 284, de-energizing solenoid 285 of valve 207 and thus admitting hydraulic fluid to line 208. This advances piston 86 of cylinder 87, clamping plunger 75 by means of wedge 88 and pin 89.

Since the work-piece has been loaded into clamping fixture 21, the operator may now press "start cycle" button 286 energizing relay 287 through normally closed contacts 288 of relay 289 and through normally open contacts of limit switch 290 which was closed by full traverse of slide 13, and through normally closed contacts 292 of relay 293. Energization of such relay 287 closes contacts 294, energizing solenoid 295 of four-way valve 212 to admit fluid pressure to line 214 connected to cylinder 144 and thereby advance piston 145 and clamping member 146 carried thereby to engage the work and hold the same firmly in position on plug 142. If the work-piece is properly loaded into the fixture, the pin end of the connecting rod will depress plunger 147, thereby tripping limit switch 149. Such tripping of limit switch 149 and tripping of pressure switch 215 caused by pressure build-up in line 214 and tripping of pressure switch 210 caused by pressure build-up in line 208 causes energization of relay 275 through normally open contacts 296 which were closed by energization of relay 287 above mentioned, and through normally closed contacts 297 of relay 281. Energization of relay 275 closes contacts 298 and opens contacts 274 which de-energizes relay 276. Closing of contacts 298 energizes solenoid 299 of four-way valve 245 admitting fluid pressure to line 246 of cylinder 59 advancing piston 58 thereby to advance quill 27.

As quill 27 thus advances to the left as viewed in Fig. 20, probe 9 will advance therewith. When collar 46 (Figs. 7 and 8) on probe rod 41 engages bushing 48, just prior to engagement of probe 9 with the work clamped in the fixture, such bushing will be shifted to the left since spring 45 is stronger than spring 51. Such shifting of bushing 48 (for a short distance only since probe 9 will contact the work soon thereafter) serves to rock gear segment 84 to reciprocate locating wedge 85, such reciprocation ceasing the moment probe 9 contacts the work. Probe rod 41 is now incapable of further advance so that continued advance of bracket 39 and quill 27 is only permitted by compression of spring 45 until the forward end of plunger 75 engages locating wedge

85. This rocks lever 80 to actuate limit switch 79. Such closing of switch 79 energizes timedelay relay 300 which after such time delay opens normally closed contacts 301, de-energizing relay 302. De-energization of such relay 302 opens contacts 303, de-energizing solenoid 304 of fourway valve 219 to admit fluid pressure to line 220 of cylinder 291 to shift piston 90 and wedge 93 carried thereby to close clamping members 92 and 96 tightly upon quill 27 firmly to retain the latter in the advanced position it has now reached.

Pressure build-up in line 220 now trips pressure switch 222, closing contacts 305 and energizing relay 306 through normally closed contacts 307 of limit switch 282 and normally closed contacts 308 of relay 293. Such energization of relay 306 closes normally open contacts 309, energizing solenoid 310 of four-way valve 224 to admit fluid pressure to line 227 of cylinder 225 to advance piston rod 228 and slide 13 of face milling cutter 10, traversing the latter at a relatively rapid rate toward the work until the piston of cylinder 225 closes side port connected line 230 so that oil discharge is now regulated by flow control valve 232 in line 231 with resultant relatively slow traverse of the cutter during actual machining of the work-piece.

When the milling traverse has been completed, limit switch 282 is tripped, opening contacts 307 and thereby de-energizing relay 303, thereby opening contacts 309 de-energizing solenoid 310 of four-way valve 224. The spring center of such valve 224 blocks fluid pressure through both lines 226 and 227 thereby stopping traverse of slide 13. Tripping of limit switch 282 also closes normally open contacts 293 energizing relay 281. Energizing of relay 281 closes contacts 284 and energizes solenoid 285 of four-way valve 207 thereby admitting fluid pressure to line 209 connected to cylinder 87. Piston 86 is thereupon shifted to the right as viewed in Fig. 20 to retract wedge 88 and release locking pin 89 so that plunger 75 may automatically be shifted to the right under the action of spring 77. Such shifting of plunger 75, of course, withdraws the end of the latter from wedge 85 so that limit switch 79 is again opened. Opening of limit switch 79 de-energizes relay 300, closing normally closed contacts 301 of relay 300 and energizing relay 302. Energization of relay 302 closes normally open contacts 303, energizing solenoid 304 of four-way valve 219 and admitting fluid pressure to line 221 of cylinder 91, thereby withdrawing piston 90 to release the means clamping quill 27 in its predetermined advanced position. It is consequently now possible to return such quill and its associated bracket 39 to the right within housing 8 (Fig. 20). The aforementioned energization of relay 281 opens its normally closed contacts 297, de-energizing relay 275 and opening its contacts 298, thereby de-energizing solenoid 299 of four-way valve 245. The spring center of valve 245 closes fluid pressure to both lines 247 and 246. Release of pressure in line 220 connected to cylinder 91 and pressure switch 222 closes contacts 273 of pressure switch 222, energizing relay 276 through normally closed contacts 274 of relay 275 and through normally open contacts 271 of limit switch 272 which had been tripped upon the advance of quill 27. Energization of relay 276 closes its normally open contacts 277 energizing solenoid 278 of four-way valve 245, admitting fluid pressure to line 247 of cylinder 59. Piston 59 is now shifted to the right as seen in Fig. 20 to return quill 27 with consequent opening of limit switch 272, opening its contacts 271, de-energizing relay 276, opening its contacts 277, and de-energizing solenoid 278 of four-way valve 245 to allow spring center of valve 245 to block fluid pressure to lines 247 and 246, thereby stopping further movement and leaving quill 27 in only partially returned position. As was seen above, full return of the quill with consequent engagement of plunger head 76 with wedge 71 can only take place after a new workpiece has been placed upon the scale and such wedge has thereupon been properly adjusted.

Release of limit switch 272 closes its contacts 311, energizing relay 312 through normally closed contacts 313 of relay 306. Energization of relay 312 closes its contacts 314 energizing solenoid 315 of four-way valve 222 admitting fluid pressure to line 226 through check valve 233 to cylinder 225, thereby now returning slide 13 rapidly to starting position.

Simultaneously with the initiation of the advance of quill 27 and probe 9, slide 15 carrying the hollow milling cutter 20 will be advanced toward the work. As above explained, the clamping of the work in the fixture 21 has served to cause operation of pressure switch 215, and tripping of limit switch 149 indicating that the workpiece is clamped in proper position energizes relay 316 through normally closed contacts 317 of relay 318 and normally closed contacts 319 of relay 293. Energizing of relay 316 closes its contacts 320, energizing solenoid 321 of four-way valve 235 to admit fluid pressure through line 236 to cylinder 140 (Fig. 20), thereby rapidly advancing slide 15 toward the work until piston 139 in cylinder 140 closes side port of line 238 so that discharge of oil through line 239 through flow control valve 240 serves to reduce the rate of advance of such slide. Cutter 20 now engages the work and makes the cut as it is thus fed forward, the depth of the cut being determined by engagement of plunger 119 with previously adjusted wedge 121. When such plunger engages such wedge, limit switch 115 is closed to energize a time-delay relay 322 which closes normally open contacts 323, energizing relay 318 through normally closed contacts 324 of relay 293 and normally closed contacts 325 of limit switch 291 (which were permitted to close when slide 15 began its advance). Energization of relay 318 opens normally closed contacts 317, thereby de-energizing relay 316 which opens normally open contacts 320, de-energizing solenoid 321 of valve 235. This accordingly now blocks admittance of pressure to both lines 236 and 237. Energization of relay 318 closes normally open contact 326, energizing solenoid 327 of four-way valve 235 to admit fluid pressure to line 237 and through check valve 241 to line 239 and cylinder 140, returning slide 15. Slide 15 continues to return until limit switch 291 is tripped to open normally closed contacts 325, de-energizing relay 318 to open its contacts 326, and thereby de-energizing solenoid 327 of four-way valve 235, blocking fluid pressure to lines 236 and 237 and thus stopping movement of the slide.

As slide 15 advanced, it tripped limit switch 170 closing its normally open contacts 328 to energize relay 329 through normally open contacts 330 of relay 287 which were closed by prior energization of relay 287. Tripping of switch 291 by return of such slide as above mentioned closes contacts 331, setting up the work clamping control circuit so that when the quill 27 has been partially retracted after completion of the face milling operation the work will automatically be unclamped.

As pointed out above, return of quill 27 serves to release limit switch 272 which closes its contacts 311, energizing relay 289 through normally open contacts 332 closed by relay 329 when the latter was energized as above indicated, and through normally closed contacts 333 of relay 293. Energization of relay 289 opens its normally closed contacts 288, de-energizing relay 287. De-energization of solenoid 287 opens its contacts 294, thereby de-energizing solenoid 295 of four-way valve 212.

Energization of relay 289 also closes its normally open contacts 334, energizing solenoid 335 of four-way valve 212 to admit fluid pressure to line 213 and cylinder 144, thereby to retract piston 145 to unclamp the work. The operator now removes the work-piece from the fixture and may immediately insert another taken from the scales (if the weighing operation has been completed).

A new work-piece may be placed on the scales as soon as one has been removed therefrom, although, of course, the next weighing operation cannot commence until the stock removal control wedges are unlocked.

Figure 25:
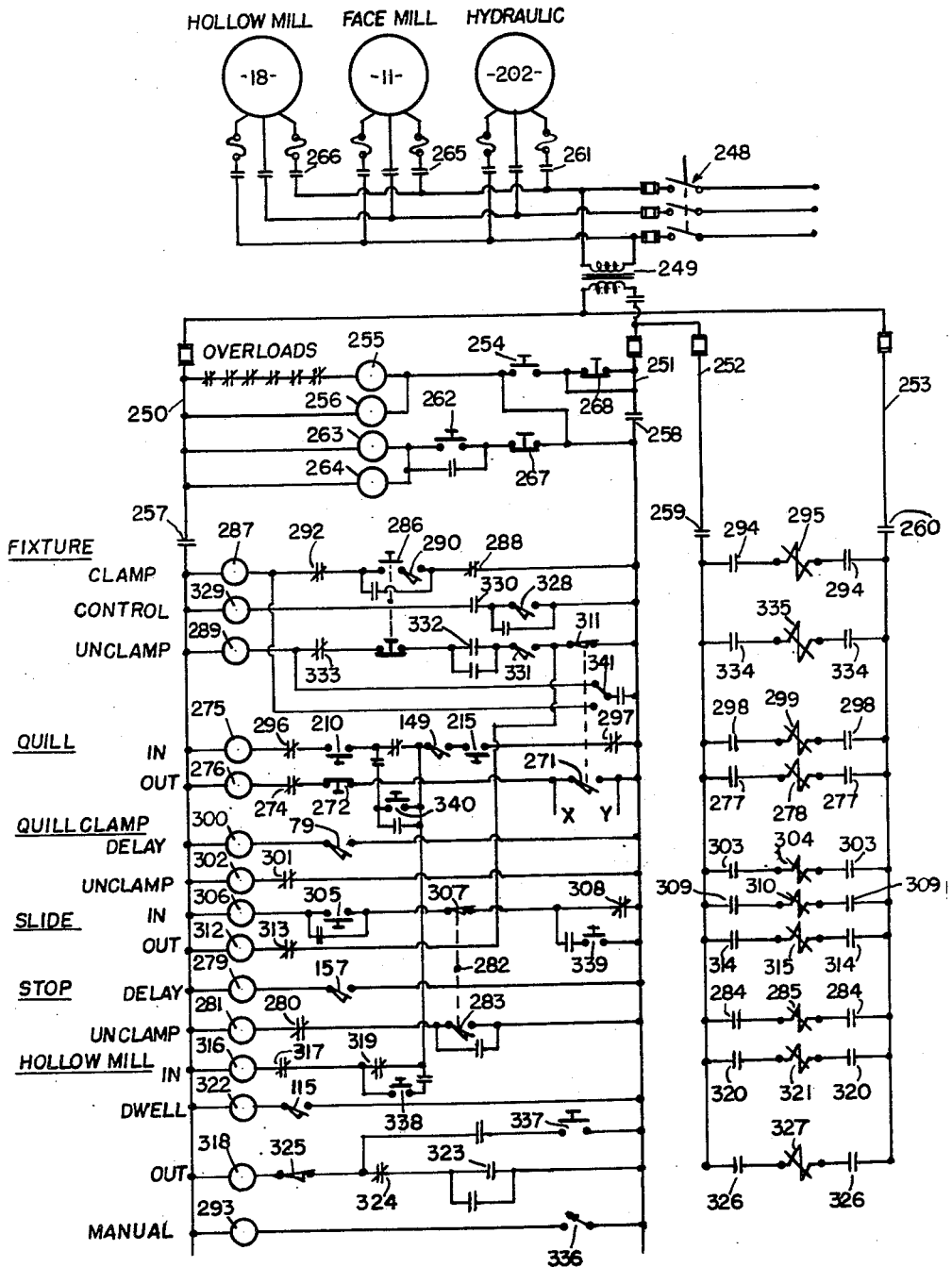
Fig. 25 is a wiring diagram of the electric circuits controlling operation of such fluid pressure system.

As shown in Fig. 25, automatic manual selector 336 is provided which may be turned to "manual" position to permit individual operation of the various units for set-up purposes. In "manual" position this switch causes energization of relay 293 which connects individual push buttons into the unit circuits while disconnecting the automatic interrelation of such units. Thus, button 337 may now be pushed to cause slide 15 to move out, button 338 to cause such slide to move in, button 339 to cause slide 13 to move in, button 340 to cause quill 27 to move in, and selector switch 341 may be operated to clamp or unclamp the fixture.

As above mentioned, the employment of an adjustable wedge to limit the advance of a cutting tool relative to a work-piece is broadly old, such adjustment having previously, however, to be made manually. The operation of our new machine is substantially independent of the skill and care of the operator.

The slope or taper of stock removal control wedges 71 and 121 are selected so that for the particular work-piece being operated on an amount of metal will be caused to be removed therefrom corresponding to the reading of the scale. Thus, for example, the scale, selsyn control means, and wedge might be calibrated so that a rotation of the scale selsyn two degrees would cause the wedge to be reciprocated one-half inch, permitting the cutting tool to be advanced one-sixteenth of an inch into the work to remove a weight of metal equal to that which caused such two degree rotation of the selsyn. Of course, as above indicated, the work-piece may be formed with a small boss intended to be partly milled away and the amount of metal removed at any setting of the cutting tool will depend on the cross-section of such boss. The selection of the stock removal control wedges will be governed accordingly, and ordinarily new wedges will be required for each new job.

Referring to Fig. 8, it will be recalled that the quill carrying cutter 10 always returns to the same fully retracted position but that the position of plunger 75 relative thereto will be determined by engagement with wedge 71. Such plunger is then locked in such adjusted position after having thus "taken a reading" from the wedge. Accordingly, the result is the same as though wedge 71 were carried by the quill and situated in the place occupied by the forward end of plunger 75. It is preferred that the wedge be left behind as the quill advances, so that it may be re-set while the milling operation is taking place. The taper of the wedge will be varied depending on the type of work-piece to be operated upon, and it will be understood that the machine is intended to handle long runs of identical work-pieces (i. e. identical, except for slight discrepancies in weight or balance).

In the case of the hollow milling operation (or equivalent), the setting of wedge 121 controls the depth of cut, the face of the work-piece being always identically located. In the case of the face milling operation, however, where a boss is provided on the end of such work-piece for partial removal by the cutter, it first becomes necessary to locate the end of such boss so that the depth of cut predetermined by setting of wedge 71 may be in relation thereto. Such locating requires that the end of such boss lie within the range of reciprocation of probe 9 during reciprocation of bushing 48, rocking of segment 84 serving to reciprocate locating wedge 85 a distance such that the portion of the face of such wedge to be engaged by the end of plunger 75 will recede an equal distance (i. e. equal to reciprocation of bushing 48) in the direction of probe advance. Instead of the end of plunger 75 now encountering wedge 85 at the original arbitrary setting of the latter (chosen to correspond to the end of such boss when the latter projects a maximum distance from the work) such plunger can now advance a distance equal to the difference between such arbitrary point and the actual position of the end of such boss, plus an additional distance determined by the presetting of plunger 75 by wedge 71, such latter distance being the depth of cut of milling cutter 10. Operation of limit switch 79 serves to clamp the milling cutter quill 27 in properly advanced position and the slide may now be traversed to make the cut.

When plunger 75 was clamped in the position determined by wedge 71 it will be appreciated that the end of such plunger was thereby fixed relative to cutter 10 so that subsequent controlled reciprocation of the plunger bodily with bracket 39 and quill 27 resulted in identical reciprocation of the cutter. The mechanical elements employed permit ample power to be applied to reciprocate the quill without, however, imposing such a heavy force or impact on the probe when contacting the work as to impair the delicacy of the ensuing adjustments.

The particular type of machine tool employed will, of course, vary depending on the metal-removing operation to be performed, milling machines ordinarily being preferred when suitable. Various types of drilling, boring, chamfering, cut-off, etc., machines may often be utilized, however, with the depth of cut controlled in the same general manner. Also, the number of such machines employed may obviously be one or more as required. In the embodiment illustrated and described herein, if one end of a work-piece should happen to be in perfect balance then the corresponding milling machine would make no cut. A great variety of work-pieces may, of course, be weighed or balanced, and then machined accordingly, pistons being a further example.

By a simple reversal of parts the work-clamping fixture may be caused to reciprocate toward the tool rather than traversing the tool, such expedients being well understood in the art. Potentiometers may also be utilized instead of selsyns although the latter are preferred in our control system. The G-E Electronic Positioning Control System, commercially available from General Electric Company, Schenectady, New York, may be utilized thus automatically to convert the scale reading to a corresponding adjustment of wedge 71 or 121, or equivalent adjustable stop means.

When the nature of the work is such that its surface will always be precisely uniformly located, then there is, of course, no need for employment of a probe means. On the other hand, the employment of an adjustable rear stop, such as wedge 71, from which an adjustable gauge means such as plunger 75 takes a "reading" has the advantage that such rear stop may be re-set in response to weighing of another work-piece before the material-removing operation is completed, resulting in a very consequential saving of time. The forward stop, limiting advance of plunger 75 and the associated cutting tool, need not be adjustable if the surface of the work is always uniformly located and, in fact, such surface may then itself serve as such forward stop, particularly if the cutting tool is adapted to be advanced directly into the work rather than subsequently laterally traversed to make a cut.

While, as indicated, when a rotary tool is employed, it is preferred to mount the same in a quill, other slide means may carry the tool for reciprocation toward and away from the work. Indeed, the entire housing may be mounted for such reciprocation as well as for lateral traverse, wedge 71 being supported on the base to be left behind as the housing advances. Likewise, probe 9 may be provided with separate piston-cylinder means for reciprocation of the same although it is convenient to employ the same means which reciprocates the tool. Adjustable rear stop 71 may be in a variety of shapes or forms rather than a wedge, as shown, and may, for example, be a cam or screw. Certain of the advantages of our invention are obviously realized even if such stop is set manually, with the operator merely reading the scale dial, but the fully automatic arrangement is, of course, preferred.

One great advantage of our probe mechanism resides in the fact that while actuation of limit switch 79 serves to clamp the quill and tool in properly advanced position, the extent of such advance is positively controlled by mechanical engagement of the forward end of plunger 75 and wedge 85. Since such wedge is always shifted in one direction from a "zero" position, it is possible to eliminate the problem of back-lash from consideration, and it has been found that the over-all accuracy of the mechanism is quite extraordinary. No heavy force need be transmitted to the work by the probe despite the employment of powerful piston-cylinder means for advancing the tool. Accordingly, netither the work nor the probe mechanism is subjected to stresses and strains which might otherwise slightly deflect the same, with a consequent loss of accuracy. The probe sets the front stop to correspond to the position of the surface of the work and the scale and selsyn means sets the rear stop properly to adjust the intermediate gauge (plunger 75) which travels with the tool.

While it would be mechanically feasible to combine the weighing scale and the work-clamping fixture, it is preferred not to do since it would then be impossible to commence weighing another work-piece while still operating on the preceding one. Furthermore, such a combination would be rather hard on the delicate scale mechanism.

Depending on the type of work-piece to be weighed and operated upon, appropriate arrangements of selected machine tools may be provided such as, for example, two face milling machines of the type above described located to operate on the respective ends of an elongated work-piece. Instead of mounting both such machines on slides to make a traverse after the milling cutters have been properly advanced, it will ordinarily be found simpler merely to reciprocate the work-holding fixture therebetween simultaneously to make the cuts. If an end milling or like tool is employed and adjustable rear stop means such as wedge 71 utilized instead of an adjustable forward stop such as wedge 121, then an indexing fixture which can clamp two or more work-pieces may be of advantage still further to speed operations.

Other modes of applying the principle of the invention may be employed, change being made as regards the details described, provided the features stated in any of the following claims or the equivalent of such be employed.

We therefore particularly point out and distinctly claim as our invention:

1. In a machine tool having a slide, means operative to reciprocate said slide, a quill mounted on said slide for axial reciprocation at right angles to the direction of reciprocation of said slide, and a cutting tool mounted in said quill, the extent of advance of said quill and cutting tool being adapted to determine the depth of the cut which will be made in a work-piece upon such reciprocation of said slide; stop means definitely limiting return reciprocation of said quill, a plunger carried by said quill for reciprocation therewith and also for axial reciprocation relative to said quill, resilient means adapted to urge said plunger rearwardly, a reciprocably adjustable wedge mounted on said slide for movement transversely of the rear end of said plunger for engagement thereby when said quill has been returned to the extent permitted by said stop, whereby said plunger may be reciprocated relative to said quill to an extent dependent on the adjusted position of said wedge, means automatically operative to lock said plunger in such adjusted position, probe means mounted for reciprocation with said quill and also for axial reciprocation parallel thereto, a reciprocably adjustable wedge mounted on said slide for movement transversely of the forward end of said plunger for engagement thereby to prevent further advance of said plunger, quill and cutting tool, gear means operative thus to reciprocate said latter wedge, and means interconnecting said probe means and gear means to drive the latter to reciprocate said latter wedge as said probe advances, the extent of advance of said probe being limited by engagement wtih such work-piece.

2. In a machine tool having a slide, means operative to reciprocate said slide, a quill mounted on said slide for axial reciprocation at right angles to the direction of reciprocation of said slide, and a cutting tool mounted in said quill, the extent of advance of said quill and cutting tool being adapted to determine the depth of the cut which will be made in a work-piece upon such reciprocation of said slide; stop means definitely limiting return reciprocation of said quill, a plunger carried by said quill for reciprocation therewith and also for axial reciprocation relative to said quill, resilient means adapted to urge said plunger rearwardly, a reciprocably adjustable wedge mounted on said slide for movement transversely of the rear end of said plunger for engagement thereby when said quill has been returned to the extent permitted by said stop, whereby said plunger may be reciprocated relative to said quill to an extent dependent on the adjusted position of said wedge, means automatically operative to lock said plunger in such adjusted position, probe means mounted for reciprocation with said quill and also for axial reciprocation parallel thereto, a reciprocably adjustable wedge mounted on said slide for movement transversely of the forward end of said plunger for engagement thereby to prevent further advance of said plunger, quill and cutting tool, gear means operative thus to reciprocate said latter wedge, means interconnecting said probe means and gear means to drive the latter to reciprocate said latter wedge as said probe advances, the extent of advance of said probe being limited by engagement with such work-piece, and means operative to lock said quill and cutting tool against further axial movement after engagement of the forward end of said plunger with said latter wedge and before reciprocation of said slide.

3. In a machine tool having a slide, means operative to reciprocate said slide, a quill mounted on said slide for axial reciprocation at right angles to the direction of reciprocation of said slide, and a cutting tool mounted in said quill, the extent of advance of said quill and cutting tool being adapted to determine the depth of the cut which will be made in a work-piece upon such reciprocation of said slide; stop means definitely limiting return reciprocation of said quill, a plunger carried by said quill for reciprocation therewith and also for axial reciprocation relative to said quill, resilient means adapted to urge said plunger rearwardly, adjustable stop means mounted on said slide for engagement with the rear end of said plunger when said quill has been returned to the extent permitted by said first stop, whereby said plunger may be reciprocated relative to said quill to an extent dependent upon the adjusted position of said second stop, means operative to secure said plunger in such adjusted position, probe means mounted for reciprocation with said quill and also for axial reciprocation relative thereto, adjustable stop means mounted on said slide for engagement by the forward end of said plunger thereby to prevent further advance of said plunger, quill, and cutting tool, means connecting said probe and last-named stop means and adapted to be driven by advance of said probe to shift said last-named stop means, the extent of such advance of said probe being limited by engagement with such work-piece, and means operative to lock said quill and cutting tool against further axial movement after engagement of the forward end of said plunger with said last-named stop means.

4. In a machine tool having a cutting tool adapted to be advanced relative to a work-piece to make a cut therein, tool advancing means operative thus to advance said tool, and adjustable gauge means operative to predetermine the extent of such advance, thereby to obtain a cut of a definite desired depth relative to the presupposed location of the surface of such work-piece; the combination of regulating means adapted to modify such predetermined extent of advance in accordance with the actual location of such surface comprising probe means mounted for movement with said cutting tool toward such surface, said cutting tool being mounted for continued advance after corresponding advance of said probe means has been stopped by engagement of the latter with such surface, adjustable stop means adapted to limit advance of said cutting tool, and means interconnecting said probe means and stop means driven by advance of said probe means operative to shift said stop means, the degree of such shifting of said stop means being therefore controlled by engagement of said probe means with such surface.

5. In a machine tool having a cutting tool adapted to be advanced relative to a work-piece to make a cut therein, tool advancing means operative thus to advance said tool, and adjustable gauge means operative to predetermine the extent of such advance, thereby to obtain a cut of a definite desired depth relative to the presupposed location of the surface of such work-piece; the combination of regulating means adapted to modify such predetermined extent of advance in accordance with the actual location of such surface comprising probe means mounted for movement with said cutting tool toward such surface, said cutting tool being mounted for continued advance after corresponding advance of said probe means has been stopped by engagement of the latter with such surface, adjustable stop means normally positioned to limit advance of said cutting tool to such predetermined extent, and means interconnecting said probe means and stop means driven by advance of said probe means operative to shift said stop means to vary the extent of permitted advance of said cutting tool in accordance with the actual location of such surface, the degree of such shifting of said stop means being determined by engagement of said probe means with such surface.

6. In a machine tool having a cutting tool mounted for reciprocation relative to a work-piece, such reciprocation always starting from a fixed point so that the location of the surface of the work-piece and the length of stroke of such reciprocation together determine the depth of cut, and means operative to reciprocate said cutting tool; gauge means mounted for reciprocation relative to said cutting tool and parallel to the direction of reciprocation of said cutting tool, adjustable stop means adapted adjustably to limit reciprocation of said gauge means away from such work surface, means operative to lock said gauge means in such adjusted position relative to said cutting tool for travel together toward such surface, adjustable stop means adapted adjustably to limit reciprocation of said gauge means, and therefore of said cutting tool, in the direction of such surface, and probe means mounted for movement toward such surface and connected with said last-named stop means to shift the latter by such movement, such shifting therefore ceasing when said probe means engages such surface.

7. In a machine tool having a cutting tool mounted for reciprocation relative to a work-piece, and means operative to reciprocate said cutting tool; means operative to control the depth of cut made by said cutting tool in such work-piece comprising adjustable gauge means mounted for reciprocation with said cutting tool toward such work-piece, adjustable stop means positioned to engage said gauge means adjustably to limit advance of the latter and said cutting tool toward such work-piece, a probe mounted for reciprocation parallel to said cutting tool and gauge means and adapted to engage the surface of such work, said probe being operative to shift said stop means as it advances, and means operative to adjust the position of said gauge means relative to said cutting tool to predetermine the advance of said gauge and cutting tool relative to said stop means.

8. In a machine tool having a cutting tool mounted for reciprocation relative to a work-piece, and means operative to reciprocate said cutting tool; means operative to control the forward stroke of such reciprocation comprising gauge means connected with said cutting tool for reciprocation therewith in the same direction, stop means arranged and disposed to engage said gauge means to limit forward movement of the latter, adjustable stop means arranged and disposed to limit rearward movement of said gauge means, said gauge means being mounted for reciprocation relative to said cutting tool by engagement of said gauge means with said adjustable stop means during rearward reciprocation of said cutting tool, thereby correspondingly to adjust said gauge means relative to said cutting tool, and means operative to hold said gauge means in such adjusted relative position during forward movement of the same and said cutting tool.

9. In a machine including weighing means operative to weigh a work-piece to determine the amount of overweight of the same relative to a predetermined standard, a machine tool adapted to perform a material-removing operation on such work-piece, and a fixture to which such work-piece may be transferred from said weighing means after completion of the weighing operation adapted to hold the same during a subsequent material-removing operation performed thereon by said machine tool, said machine tool having a cutting tool mounted for reciprocation relative to such work-piece in said fixture, the extent of the advance of said cutting tool relative to such work-piece being adapted to determine the depth of cut obtained; means operative to control the forward stroke of such reciprocation comprising gauge means connected with said cutting tool for reciprocation therewith, stop means arranged and disposed to engage said gauge means to limit forward movement of the latter, adjustable stop means arranged and disposed to limit rearward movement of said gauge means, said gauge means being mounted for reciprocation relative to said cutting tool by engagement of said gauge means with said adjustable stop means during rearward reciprocation of said cutting tool, thereby correspondingly to adjust said gauge means relative to said cutting tool, means operative to hold said gauge means in such adjusted relative position during forward movement of the same and said cutting tool, and control means operatively connecting said weighing means and adjustable stop automatically operative to shift the latter in response to operation of said weighing means to determine a depth of cut effective to ensure removal of an amount of material equal to the amount of overweight determined by said weighing means, whereby a work-piece may be transferred to said fixture for performance of such material-removing operation thereon and readjustment of said adjustable stop commenced in response to weighing of another following work-piece as soon as said gauge means has been moved away from said adjustable stop by forward movement with said cutting tool.

10. In a machine including weighing means operative to weigh a work-piece to determine the amount of overweight of the same relative to a predetermined standard, a machine tool adapted to perform a material-removing operation on such work-piece, and a fixture to which such work-piece may be transferred from said weighing means after completion of the weighing operation adapted to hold the same during a subsequent material-removing operation performed thereon by said machine tool, said machine tool having a cutting tool mounted for reciprocation relative to such work-piece in said fixture, the extent of the advance of said cutting tool relative to such work-piece being adapted to determine the depth of cut obtained; means operative to control the forward stroke of such reciprocation comprising gauge means connected with said cutting tool for reciprocation therewith, stop means arranged and disposed to engage said gauge means to limit forward movement of the latter, adjustable stop means arranged and disposed to limit rearward movement of said gauge means, said gauge means being mounted for reciprocation relative to said cutting tool by engagement of said gauge means with said adjustable stop means during rearward reciprocation of said cutting tool, thereby correspondingly to adjust said gauge means relative to said cutting tool, means operative to hold said gauge means in such adjusted relative position during forward movement of the same and said cutting tool, drive means including an electric motor adapted to shift said adjustable stop to determine the depth of cut to be made by said cutting tool, and control means for said drive means comprising selsyn means operable by said weighing means adapted to control the direction and extent of operation of said motor correspondingly to the amount of overweight of such work-piece indicated by said weighing means, thus determining a depth of cut effective to ensure removal of an amount of material equal to the amount of overweight determined by said weighing means, whereby a work-piece may be transferred to said fixture for performance of such material-removing operation thereon and readjustment of said adjustable stop commenced in response to weighing of another following work-piece as soon as said gauge means has been moved away from said adjustable stop by forward movement with said cutting tool.

11. In a machine tool having a material-removing tool mounted for reciprocation relative to a work-piece, the depth of cut of such tool determining the amount of material removed, and means operative to reciprocate said tool; means operative to limit such reciprocation to control such depth of cut comprising gauge means mounted for reciprocation with said tool and adjustable relative to said tool in the direction of such reciprocation, adjusting means engageable with said gauge means upon return reciprocation of the latter with said tool and operative to adjust said gauge means relative to said tool, forward stop means adapted to limit forward reciprocation of said gauge means and therefore of said tool, and means operative to hold said gauge means rigidly in such adjusted position relative to said tool during such forward reciprocation of said gauge means and tool together.

12. In a machine tool having a material-removing tool mounted for reciprocation relative to a work-piece, the depth of cut of such tool determining the amount of material removed, and means operative to reciprocate said tool; means operative to limit such reciprocation to control such depth of cut comprising gauge means mounted for reciprocation with said tool and adjustable relative to said tool in the direction of such reciprocation, adjusting means engageable with said gauge means upon return reciprocation of the latter with said tool and operative to adjust said gauge means relative to said tool, forward stop means adapted to limit forward reciprocation of said gauge means and therefore of said tool, means operative to hold said gauge means in such adjusted position relative to said tool during such forward reciprocation, and control means responsive to operation of weighing means operative to drive said adjusting means to adjust said gauge means.

13. In a machine tool having a material-removing tool mounted for reciprocation relative to a work-piece, the depth of cut of such tool determining the amount of material removed, and means operative to reciprocate said tool; means operative to limit such reciprocation to control such depth of cut comprising gauge means mounted for reciprocation with said tool and adjustable relative to said tool in the direction of such reciprocation, adjusting means operative to adjust said gauge means relative to said tool, forward stop means adapted to limit forward reciprocation of said gauge means and therefore of said tool, means operative to hold said gauge means in such adjusted position relative to said tool during such forward reciprocation, and selsyn control means adapted to be actuated by operation of weighing means to drive said adjusting means.

14. A material-removing tool mounted for reciprocation into and out of work-engaging positions, gauge means mounted for reciprocation with said tool but adjustable relative thereto in the direction of such reciprocation, a forward stop adapted to limit reciprocation of said gauge means and tool toward such work, adjustable rear stop means adapted to engage and shift said gauge means upon return reciprocation of said gauge means and tool to determine the extent of the next forward reciprocation thereof, and means operative to interconnect said tool and gauge means for reciprocation together in the same direction away from said adjustable rear stop means, whereby said rear stop means may be re-set while said tool and gauge are both in forward position with a resultant saving of cycle time.

15. A tool mounted for reciprocation toward and away from a work-piece, gauge means mounted for reciprocation with said tool and adapted to limit advance of said tool toward such work, said gauge means being adjustable relative to said tool to vary the extent of such advance, adjusting means for said gauge means operative to readjust said gauge means during return reciprocation of said tool, means operative to interconnect said tool and gauge means for reciprocation together in the same direction away from said adjusting means, and means adapted to preset said adjusting means for such readjustment before said tool has fully returned.

16. In a machine tool having a material-removing tool mounted for reciprocation relative to a work-piece, and means operative to reciprocate said latter tool; means operative to control the forward stroke of such reciprocation comprising gauge means mounted for reciprocation in the same direction with said tool, said gauge means also being mounted for reciprocation relative to said tool in the direction of reciprocation of the latter, resilient means adapted to urge said gauge means rearwardly relative to said tool, gauge-adjusting means adapted to engage said gauge means during rearward reciprocation of said gauge means with said tool adjustably to position said gauge means relative to said tool against the action of said resilient means, and means operative to hold said gauge means in such adjusted relative position during forward movement of the same with said tool away from said gauge-adjusting means.

17. In a machine tool having a material-removing tool mounted for reciprocation relative to a work-piece, and means operative to reciprocate said latter tool; means operative to control the forward stroke of such reciprocation comprising gauge means mounted for reciprocation with said tool, adjustable forward stop means adapted adjustably mechanically to limit forward movement of said gauge means and hence the forward stroke of said tool; and means operative to adjust said stop means comprising a probe mounted for reciprocation parallel to said tool and adapted to contact the surface of such work-piece, and drive means mechanically interconnecting said probe and stop means adapted to shift the latter through advance of said probe.

18. In a machine tool having a material-removing tool mounted for reciprocation relative to a work-piece, and means operative to reciprocate said latter tool; means operative to control the forward stroke of such reciprocation comprising gauge means mounted for reciprocation with said tool, adjustable forward stop means adapted adjustably mechanically to limit forward movement of said gauge means and hence the forward stroke of said tool; and means operative to adjust said stop means comprising a probe mounted for reciprocation parallel to said tool and adapted to contact the surface of such work-piece, drive means mechanically interconnecting said probe and stop means adapted to shift the latter through advance of said probe, resilient means adapted to urge said probe forwardly into driving engagement with said drive means, and means operative to advance said probe through said resilient means, said resilient means being of sufficient strength to impart the necessary stop-shifting force therethrough without appreciable yielding of said resilient means but nevertheless being adapted yieldingly to support said probe when the latter engages such work during continued advance of said probe-advancing means.

19. In a machine tool having a material-removing tool mounted for reciprocation relative to a work-piece, and means operative to reciprocate said latter tool; means operative to control the forward stroke of such reciprocation comprising gauge means mounted for reciprocation with said tool, adjustable forward stop means adapted adjustably mechanically to limit forward movement of said gauge means and hence the forward stroke of said tool; and means operative to adjust said stop means comprising a probe mounted for reciprocation parallel to said tool and adapted to contact the surface of such work-piece, gear means adapted to be driven by advance of said probe mechanically interconnecting said probe and stop means to shift the latter, and probe advancing means, including a resilient element adapted yieldingly to support said probe of sufficient strength to impart the necessary stop-shifting force therethrough without appreciable yielding but nevertheless adapted resiliently to yield when said probe engages such work during continued advance of said probe advancing means.

20. In a machine tool having a material-removing tool mounted for reciprocation relative to a work-piece, and means operative to reciprocate said latter tool; means operative to control the forward stroke of such reciprocation comprising gauge means mounted for reciprocation with said tool, adjustable forward stop means adapted adjustably mechanically to limit forward movement of said gauge means and hence the forward stroke of said tool; and means operative to adjust said stop means comprising a probe mounted for reciprocation parallel to said tool and adapted to contact the surface of such work-piece, gear means adapted to be driven by advance of said probe mechanically interconnecting said probe and stop means to shift the latter, and resilient means interposed between said tool-reciprocating means and said probe adapted to advance said probe with said tool, said resilient means being sufficiently rigid to impart the necessary stop-shifting force therethrough without appreciable yielding thereof but nevertheless adapted yieldingly to support said probe when the latter engages such work during continued advance of said tool reciprocating means, whereby said tool may continue to advance until halted by engagement of said gauge means with said adjusted forward stop means.

21. In a machine including weighing means adapted to weigh an overweight work-piece to determine the amount of overweight of the latter, a machine tool operative to remove material from such work-piece, and adjustable gauging means adapted to limit movement of said tool relative to such work-piece to control the amount of material thus removed; selsyn means connected with said weighing means for direct rotation proportionate to movement of said weighing means, second selsyn means connected with said first selsyn means for rotation proportionate to such rotation of said first selsyn means, and power means controlled by such rotation of said second selsyn means operative to pre-set said adjustable gauging means prior to the material removing operation of said machine tool to ensure removal of the exact amount of material equal to the amount of overweight determined by said weighing means.

References Cited in the file of this patent

UNITED STATES PATENTS

| Number | Name | Date |
|---|---|---|
| 2,243,379 | Johnson | May 27, 1941 |
| 2,282,052 | Hem | May 5, 1942 |
| 2,300,354 | Eddison | Oct. 27, 1942 |
| 2,359,470 | Eddison | Oct. 3, 1944 |
| 2,368,061 | Wortendyke | Jan. 23, 1945 |
| 2,559,839 | Andrew et al. | July 10, 1951 |

FOREIGN PATENTS

| Number | Country | Date |
|---|---|---|
| 591,557 | Germany | Jan. 23, 1934 |